(12) United States Patent
Tan et al.

(10) Patent No.: US 8,906,476 B2
(45) Date of Patent: Dec. 9, 2014

(54) COMPOSITION AND RECORDING SHEET WITH IMPROVED OPTICAL PROPERTIES

(71) Applicant: International Paper Company, Memphis, TN (US)

(72) Inventors: Zheng Tan, Atlanta, GA (US); Sen Yang, Nanuet, NY (US); Jingxiu Wan, Mason, OH (US); Benny J. Skaggs, Springboro, OH (US); Benjamin Thomas Liguzinski, Cincinnati, OH (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 13/749,761

(22) Filed: Jan. 25, 2013

(65) Prior Publication Data
US 2013/0133849 A1 May 30, 2013

Related U.S. Application Data

(63) Continuation of application No. 12/464,184, filed on May 12, 2009, now Pat. No. 8,361,571.

(60) Provisional application No. 61/132,672, filed on Jun. 20, 2008.

(51) Int. Cl.
| | | |
|---|---|---|
| *B41M 5/40* | (2006.01) | |
| *B32B 29/00* | (2006.01) | |
| *D21H 21/30* | (2006.01) | |
| *B41M 5/52* | (2006.01) | |
| *B41M 5/50* | (2006.01) | |
| *B41J 2/01* | (2006.01) | |
| *D21H 21/14* | (2006.01) | |
| *D21H 17/28* | (2006.01) | |
| *D21H 17/45* | (2006.01) | |
| *D21H 21/16* | (2006.01) | |
| *D21H 19/44* | (2006.01) | |

(52) U.S. Cl.
CPC ............ *D21H 21/14* (2013.01); *B32B 29/00* (2013.01); *D21H 21/30* (2013.01); *D21H 17/28* (2013.01); *B41M 5/52* (2013.01); *D21H 17/45* (2013.01); *B41M 5/5254* (2013.01); *B41M 5/508* (2013.01); *B41J 2/01* (2013.01); *D21H 21/16* (2013.01); *D21H 19/44* (2013.01)
USPC ............... 428/32.21; 428/32.3; 428/537.5; 427/243; 347/105

(58) Field of Classification Search
CPC ....... B32B 29/00; D21H 19/10; B41M 5/508; B41M 5/52; B41M 5/5254
USPC .................. 428/32.21, 32.3, 537.5
See application file for complete search history.

(56) References Cited

U.S. PATENT DOCUMENTS

| | | |
|---|---|---|
| 2,628,918 A | 2/1953 | Wilson et al. |
| 2,684,300 A | 7/1954 | Wilson et al. |
| 3,582,464 A | 6/1971 | Aldrich |
| 3,615,972 A | 10/1971 | Morehouse, Jr. et al. |
| 3,864,181 A | 2/1975 | Wolinski et al. |
| 3,966,654 A | 6/1976 | Aldrich |
| 3,996,654 A | 12/1976 | Johnson |
| 4,006,273 A | 2/1977 | Wollinski et al. |
| 4,017,431 A | 4/1977 | Aldrich |
| 4,022,965 A | 5/1977 | Goheen et al. |
| 4,044,176 A | 8/1977 | Wollinski et al. |
| 4,075,136 A | 2/1978 | Schaper |
| 4,166,894 A | 9/1979 | Schaper |
| 4,174,417 A | 11/1979 | Rydell |
| 4,251,824 A | 2/1981 | Hara et al. |
| 4,263,182 A | 4/1981 | Aldrich |
| 4,381,185 A | 4/1983 | Swanson et al. |
| 4,410,899 A | 10/1983 | Haruta et al. |
| 4,412,224 A | 10/1983 | Sugitani |
| 4,431,481 A | 2/1984 | Drach |
| 4,496,427 A | 1/1985 | Davison |
| 4,532,530 A | 7/1985 | Hawkins |
| 4,540,635 A | 9/1985 | Ronge et al. |
| 4,554,181 A | 11/1985 | Cousin et al. |
| 4,601,777 A | 7/1986 | Hawkins et al. |
| 4,722,943 A | 2/1988 | Melber et al. |
| 4,829,094 A | 5/1989 | Melber et al. |
| 4,835,212 A | 5/1989 | Degen et al. |
| 4,844,053 A | 7/1989 | Dittrich |
| 4,849,053 A | 7/1989 | Gentile, Jr. et al. |
| 4,855,343 A | 8/1989 | Degen et al. |
| 4,986,882 A | 1/1991 | Mackey et al. |
| 5,049,235 A | 9/1991 | Barcus et al. |
| 5,156,719 A | 10/1992 | Passaretti |
| 5,160,789 A | 11/1992 | Barcus et al. |
| 5,201,944 A | 4/1993 | Nakata et al. |
| 5,209,953 A | 5/1993 | Grupe et al. |
| 5,223,091 A | 6/1993 | Hetzler et al. |
| 5,227,022 A | 7/1993 | Leonhardt et al. |
| 5,266,250 A | 11/1993 | Kroyer |

(Continued)

FOREIGN PATENT DOCUMENTS

| | | |
|---|---|---|
| EP | 0014520 | 8/1980 |
| EP | 0562821 | 9/1993 |

(Continued)

*Primary Examiner* — Betelhem Shewareged

(74) *Attorney, Agent, or Firm* — Thomas W. Barnes, III

(57) ABSTRACT

A composition is provided, which comprises a water-soluble salt of a divalent metal; a complexing agent having an affinity for the divalent metal; and an optical brightening agent. Methods of using the composition, and recording sheets which include the composition, are also disclosed.

20 Claims, 12 Drawing Sheets

(56) References Cited

U.S. PATENT DOCUMENTS

| | | |
|---|---|---|
| 5,358,998 A | 10/1994 | Wendel et al. |
| 5,360,420 A | 11/1994 | Cook et al. |
| 5,443,899 A | 8/1995 | Barcus et al. |
| 5,531,728 A | 7/1996 | Lash |
| 5,641,386 A | 6/1997 | Boelema et al. |
| 5,662,773 A | 9/1997 | Frederick et al. |
| 5,667,637 A | 9/1997 | Jewell et al. |
| H1690 H | 11/1997 | Nye |
| 5,685,815 A | 11/1997 | Bottorff et al. |
| 5,698,074 A | 12/1997 | Barcus et al. |
| 5,698,688 A | 12/1997 | Smith et al. |
| H1704 H | 1/1998 | Wallajapet et al. |
| 5,731,080 A | 3/1998 | Cousin et al. |
| 5,902,454 A | 5/1999 | Nelson |
| 6,019,870 A | 2/2000 | Devic et al. |
| 6,123,809 A | 9/2000 | Devenyns et al. |
| 6,146,494 A | 11/2000 | Seger et al. |
| 6,149,766 A | 11/2000 | Tibbling et al. |
| 6,162,328 A | 12/2000 | Cenisio et al. |
| 6,207,258 B1 | 3/2001 | Varnell |
| 6,228,161 B1 | 5/2001 | Drummond |
| 6,254,724 B1 | 7/2001 | Seltzer et al. |
| 6,264,790 B1 | 7/2001 | Jakara et al. |
| 6,361,651 B1 | 3/2002 | Sun |
| 6,379,497 B1 | 4/2002 | Sandstrom et al. |
| 6,416,627 B1 | 7/2002 | Cunkle et al. |
| 6,447,644 B1 | 9/2002 | Seltzer et al. |
| 6,471,824 B1 | 10/2002 | Jewell |
| 6,485,139 B1 | 11/2002 | Lavery et al. |
| 6,500,303 B1 | 12/2002 | Seltzer et al. |
| 6,506,282 B2 | 1/2003 | Hu et al. |
| 6,540,872 B1 | 4/2003 | Dahl |
| 6,579,414 B2 | 6/2003 | Jewell |
| 6,579,415 B2 | 6/2003 | Jewell |
| 6,582,557 B2 | 6/2003 | Jewell |
| 6,592,712 B2 | 7/2003 | Koukoulas et al. |
| 6,592,717 B2 | 7/2003 | Jewell |
| 6,599,326 B1 | 7/2003 | Seltzer et al. |
| 6,605,181 B1 | 8/2003 | Bergqvist et al. |
| 6,617,364 B2 | 9/2003 | Soane et al. |
| 6,686,054 B2 | 2/2004 | Nigam |
| 6,706,143 B1 | 3/2004 | Tsai |
| 6,761,977 B2 | 7/2004 | Nigam |
| 6,764,726 B1 | 7/2004 | Yang et al. |
| 6,880,928 B2 | 4/2005 | Hosoi et al. |
| 6,893,473 B2 | 5/2005 | Neogi et al. |
| 6,989,449 B1 | 1/2006 | Cunkle et al. |
| 7,033,428 B2 | 4/2006 | Drummond |
| 7,282,113 B2 | 10/2007 | Elgarhy et al. |
| 7,351,764 B2 | 4/2008 | Sheuchenko et al. |
| 8,361,571 B2 | 1/2013 | Tan |
| 2001/0044477 A1 | 11/2001 | Soane et al. |
| 2001/0050153 A1 | 12/2001 | Wajer et al. |
| 2002/0084049 A1 | 7/2002 | Engelhardt et al. |
| 2003/0008115 A1 | 1/2003 | Sugiyama et al. |
| 2003/0008931 A1 | 1/2003 | Soane et al. |
| 2003/0008932 A1 | 1/2003 | Soane et al. |
| 2003/0062138 A1 | 4/2003 | Hache et al. |
| 2004/0065423 A1 | 4/2004 | Swerin et al. |
| 2004/0118529 A1 | 6/2004 | Kamijo et al. |
| 2004/0123966 A1 | 7/2004 | Altman et al. |
| 2004/0157057 A1 | 8/2004 | Tasaki et al. |
| 2005/0155731 A1 | 7/2005 | Martin et al. |
| 2005/0194111 A1 | 9/2005 | Duggirala et al. |
| 2005/0217813 A1 | 10/2005 | Shevchenko et al. |
| 2006/0102307 A1 | 5/2006 | Kron et al. |
| 2007/0062653 A1 | 3/2007 | Duggirala et al. |
| 2007/0087138 A1 | 4/2007 | Koenig et al. |
| 2007/0119560 A1 | 5/2007 | Birkert et al. |
| 2007/0131365 A1 | 6/2007 | Duggirala |
| 2007/0131373 A1 | 6/2007 | Shevchenko et al. |
| 2007/0246176 A1 | 10/2007 | Miyawaki et al. |
| 2007/0277947 A1 | 12/2007 | Nguyen |
| 2007/0277950 A1 | 12/2007 | Skaggs et al. |
| 2008/0035286 A1 | 2/2008 | Aichinger et al. |
| 2008/0035287 A1 | 2/2008 | Lee et al. |
| 2008/0035292 A1 | 2/2008 | Singh et al. |
| 2008/0060775 A1 | 3/2008 | Cunkle et al. |
| 2008/0066878 A1 | 3/2008 | Nguyen |
| 2008/0081175 A1 | 4/2008 | Mukkamala |
| 2008/0163993 A1 | 7/2008 | Varnell |

FOREIGN PATENT DOCUMENTS

| | | |
|---|---|---|
| EP | 0740015 | 10/1996 |
| EP | 0666368 | 6/1999 |
| EP | 0846199 | 1/2001 |
| EP | 0629741 | 8/2001 |
| EP | 1030943 | 2/2002 |
| EP | 0882151 | 10/2003 |
| EP | 1216269 | 10/2003 |
| EP | 1131483 | 11/2003 |
| GB | 1190855 | 5/1970 |
| RU | 2223986 | 2/2004 |
| WO | 9745585 | 12/1997 |
| WO | 9745590 | 12/1997 |
| WO | 9811295 | 3/1998 |
| WO | 9905108 | 2/1999 |
| WO | 9920829 | 4/1999 |
| WO | 9941448 | 8/1999 |
| WO | 9946440 | 9/1999 |
| WO | 9946441 | 9/1999 |
| WO | 9954544 | 10/1999 |
| WO | 0024963 | 5/2000 |
| WO | 0024966 | 5/2000 |
| WO | 0068495 | 11/2000 |
| WO | 0120078 | 3/2001 |
| WO | 2004027147 | 4/2004 |
| WO | 2006110751 | 10/2006 |
| WO | 2007070654 | 6/2007 |
| WO | 2007085579 | 8/2007 |
| WO | 2008011523 | 1/2008 |
| WO | 2008017585 | 2/2008 |

Figure 11

Size Press Treatments on Courtland Base
Felt Side Sheet Brightness & Whiteness Data

| Formula # | Initial Brightness | Initial CIE Whiteness (D65) | 24 Hour Exposure: Brightness After UV Light Exposure | 24 Hour Exposure: Whiteness After UV Light Exposure | 24 Hour Exposure: Brightness After Daylight Exposure | 24 Hour Exposure: Whiteness After Daylight Exposure |
|---|---|---|---|---|---|---|
| Q32-Control-No Ca(II) | 94.50 | 148.99 | 94.18 | 142.78 | 94.60 | 139.71 |
| Q33-Control Ca(II) | 94.00 | 141.33 | 93.00 | 134.06 | 93.80 | 133.11 |
| Q34-PEG/Ca(II) | 94.10 | 141.70 | 93.22 | 135.51 | 93.70 | 133.94 |
| Q35-FAS/PEG/Ca(II) | 94.80 | 140.80 | 94.62 | 137.81 | 95.10 | 134.67 |
| Q36-Versene/PEG/Ca(II) | 94.20 | 143.17 | 93.88 | 137.98 | 94.10 | 136.25 |
| Q37-Versenex/PEG/Ca(II) | 94.20 | 142.71 | 93.40 | 137.61 | 94.00 | 135.68 |
| Q38-FAS /Ca(II) | 94.70 | 140.42 | 94.20 | 135.06 | 94.80 | 133.71 |
| Q39-Versene /Ca(II) | 94.00 | 142.72 | 93.50 | 137.26 | 93.70 | 134.20 |
| Q40-Versenex /Ca(II) | 94.00 | 143.57 | 93.44 | 136.26 | 93.90 | 134.91 |

COMPOSITION AND RECORDING SHEET WITH IMPROVED OPTICAL PROPERTIES

BACKGROUND

1. Field of the Invention

This invention relates to compositions for use in papermaking. The invention also relates to methods of making and using paper products, for example, recording sheets, which include the composition.

2. Discussion of the Background

The demand in the marketplace is increasing for recording sheets, printing papers, writing papers, and the like which have superior printing and optical properties. To improve brightness and whiteness, for example, optical brighteners (OBAs) are being used in larger amounts. The OBAs are expensive, however, and their increased use contributes substantially to higher product costs.

To improve printing properties such as ink density and dry time, cationic metals have been used. Calcium chloride is currently used in ink jet recording media to enhance inkjet print density and dry time. See, for example, U.S. Patent Application Publication 2007/0087138, published on Apr. 19, 2007, which discloses a recording sheet with improved image dry time which contains water soluble divalent metal salts. Other metal salts have been used in ink jet recording media. U.S. Pat. No. 4,381,185 discloses paper stock which contains polyvalent metal cations. U.S. Pat. No. 4,554,181 discloses an ink jet recording sheet having a recording surface which includes a water soluble polyvalent metal salt. U.S. Pat. No. 6,162,328 discloses a paper sizing for ink jet printing substrate that includes various cationic metal salts. U.S. Pat. No. 6,207,258 discloses a surface treatment composition for an ink jet printing substrate which contains a divalent metal salt. U.S. Pat. No. 6,880,928 discloses an ink jet recording base paper having a coating which includes a polyvalent metal salt. It has been found, however, that many of these cationic additives decrease the brightness and whiteness. Calcium chloride, for example, undesirably quenches stilbene-based optical brighteners such as often used at the size press. Overcoming this decrease in brightness and whiteness imposes additional costs on the papermaking process.

Another disadvantage is that the use of certain cationic additives, such as calcium chloride can create runnability issues in paper machines; and calcium chloride affects the pH of size press formulations. Starches used at the size press require a narrow pH range to be effective: too high of a pH may result in the yellowing of the starch; too low of a pH may cause the starch to precipitate and/or gel. Calcium chloride can also interact with other chemicals such as those used in the wet end when the paper is broked or recycled.

Synergistic mixtures of complexing agents, such as the known chelant, diethylenetriaminepentakis(methyl)phosphonic acid (DTPA), and polyacrylic acid have been used to enhance brightness in chemical and mechanical pulps. See, for example, U.S. Pat. No. 7,351,764. Chelating agents have also been used to produce acid-stabilized calcium carbonate slurries. See, e.g., U.S. Pat. No. 7,033,428. U.S. Patent Application Publication 2007/0062653 discloses that the use of reducing agents in combination with certain chelants enhance the brightness of a paper product via increased thermal stability of the pulp and reduction of chromophoric structures in pulp. There, it is disclosed that chelants include compounds that are capable of chelating transitional metals that form colored products with pulp constituents and catalyze color-forming reactions in the bleached pulp or paper products.

There is thus a need for a recording sheet with improved optical properties yet which reduces the costs associated with OBAs.

SUMMARY

The above problems, and others, are solved by the present invention. Quite surprisingly, the present inventors have found that a composition, comprising a water-soluble salt of a divalent metal, a complexing agent having an affinity for the divalent metal, and an optical brightening agent inheres several advantages. When used in a papermaking process, one embodiment of the present invention improves the optical properties such as whiteness and brightness of the paper product. In a recording sheet, another embodiment of the present invention exhibits improved optical properties while desirably maintaining the beneficial printing properties. It has also been found that another embodiment of the present invention desirably avoids precipitation and other runnability issues in the papermaking process.

BRIEF DESCRIPTION OF THE DRAWINGS

Various embodiments of the present invention are described in conjunction with the accompanying drawings, in which:

FIG. 11 shows tabular data of several inventive and comparative embodiments and their effects upon UV and daylight aging.

DETAILED DESCRIPTION OF THE SEVERAL EMBODIMENTS

Figure 1:
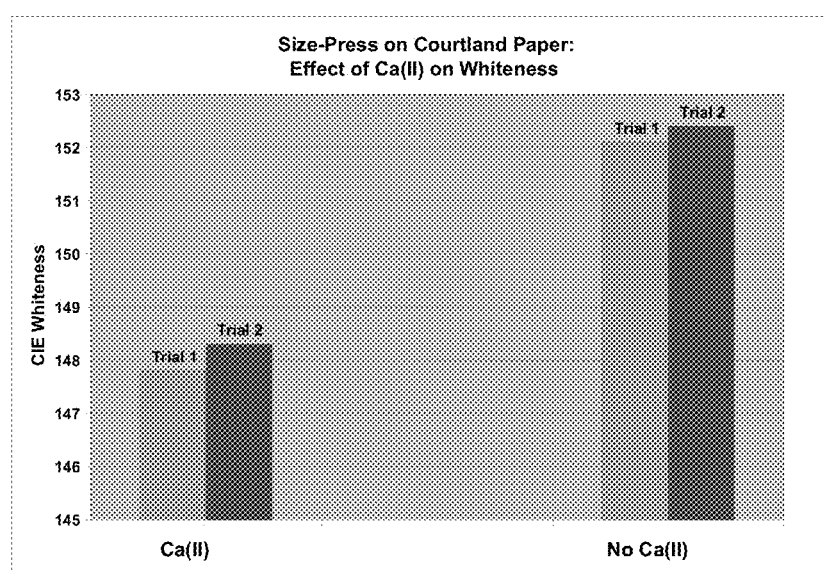
FIG. 1 shows graphical data of several inventive and comparative embodiments and their effects on whiteness.

One embodiment of the present invention desirably achieves improved optical properties with lower amounts of optical brighteners. Another embodiment of the present invention desirably achieves improved ink and printing properties. Another embodiment of the present invention desirably achieves improved optical properties and improved ink and printing properties. Another embodiment of the present invention desirably achieves improved paper machine runnability. Another embodiment of the present invention desirably achieves improved optical properties and improved machine runnability. Another embodiment of the present invention desirably achieves improved ink and printing properties and improved machine runnability. Another embodiment of the present invention desirably achieves improved optical properties, ink and printing properties, and improved runnability. Another embodiment of the present invention desirably achieves ink fastness.

One embodiment relates to a composition, which comprises:
  a water-soluble salt of a divalent metal;
  a complexing agent having an affinity for the divalent metal; and
  an optical brightening agent.

Another embodiment relates to a method for making a recording sheet, comprising contacting:
  a paper substrate comprising a plurality of cellulosic fibers; and
  a composition, comprising:
    a water-soluble salt of a divalent metal;
    a complexing agent having an affinity for the divalent metal; and
    an optical brightening agent;
  to produce a recording sheet.

Another embodiment relates to a method, comprising:
  forming an image with a printing apparatus on a surface of a recording sheet, said recording sheet comprising:
  a paper substrate comprising a plurality of cellulosic fibers; and
  a composition, comprising:
    a water-soluble salt of a divalent metal;
    a complexing agent having an affinity for the divalent metal; and
    an optical brightening agent.

Another embodiment relates to a recording sheet, comprising:
  a paper substrate comprising a plurality of cellulosic fibers; and
  a composition, comprising:
    a water-soluble salt of a divalent metal;
    a complexing agent having an affinity for the divalent metal; and
    an optical brightening agent.

The composition includes at least one divalent metal salt. When used in a recording sheet, the recording sheet may suitably contain an effective amount of the divalent water soluble metal salt in contact with at least one surface of the substrate. As used herein, an "effective amount" is an amount which is sufficient to obtain a good dry time or printing property. This total amount of divalent water soluble metal salt in the substrate can vary widely, provided that the desired result is maintained or achieved. Usually, this amount is at least 0.02 g/m$^2$, although lower or higher amounts can be used. The amount of divalent water soluble metal salt is preferably from about 0.02 g/m$^2$ to about 4 g/m$^2$, which ranges includes all values and subranges therebetween, including 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.25, 2.5, 2.75, 3, 3.25, 3.5, 3.75, and 4 g/m$^2$ or any combination thereof, and most preferably from about 0.04 g/m$^2$ to about 2.0 g/m$^2$. In one embodiment, the amount of divalent water soluble metal salt is preferably from about 0.04 g/m$^2$ to about 1.5 g/m$^2$.

Any water soluble divalent metal salt can be used in the practice of this invention. Suitable divalent water soluble metal salts include but are not limited to compounds containing divalent calcium, magnesium, barium, zinc, or any combination of these. The counter ions (anions) may be simple or complex and may vary widely. Illustrative of such materials are calcium chloride, magnesium chloride, calcium acetate, calcium lactate, calcium EDTA, Mg EDTA, and the like, and combinations thereof. Preferred divalent water soluble metal salts for use in the practice of this invention are water soluble calcium salts, especially calcium chloride.

In one embodiment, the divalent metal salt may be a mineral or organic acid salt of a divalent cationic metal ion, or a combination thereof. In one embodiment, the water soluble metal salt may include a halide, nitrate, chlorate, perchlorate, sulfate, acetate, carboxylate, hydroxide, nitrite, or the like, or combinations thereof, of calcium, magnesium, barium, zinc (II), or the like, or combinations thereof. Some examples of divalent metal salts include, without limitation, calcium chloride, magnesium chloride, magnesium bromide, calcium bromide, barium chloride, calcium nitrate, magnesium nitrate, barium nitrate, calcium acetate, magnesium acetate, barium acetate, calcium magnesium acetate, calcium propionate, magnesium propionate, barium propionate, calcium formate, calcium 2-ethylbutanoate, calcium nitrite, calcium hydroxide, zinc chloride, zinc acetate, and combinations thereof. Mixtures or combinations of salts of different divalent metals, different anions, or both are possible. The relative weight of the divalent cationic metal ion in the divalent metal salt may be maximized, if desired, with respect to the anion in the salt to provide enhanced efficiencies based on the total weight of applied salt. Consequently, for this reason, for example, calcium chloride may be preferred over calcium bromide. Equivalent performance in ink and print properties is expected when equivalent dosages of divalent metal cations in the divalent metal salts are present in the paper, expressed on a molar basis.

In one embodiment, one or more divalent metal salts are used.

In one embodiment, the divalent metal salt is soluble in the amount used in an aqueous sizing formulation. In one embodiment, it is soluble at about pH 6 to about pH 9. The aqueous sizing medium may be in the form of an aqueous solution, emulsion, dispersion, or a latex or colloidal composition, and the term "emulsion" is used herein, as is customary in the art, to mean either a dispersion of the liquid-in-liquid type or of the solid-in-liquid type, as well as latex or colloidal composition.

In one embodiment, the water solubility of the divalent metal salt may suitably range from slightly or moderately soluble to soluble, measured as a saturated aqueous solution of the divalent metal salt at room temperature. The water solubility may range from 0.01 mol/L and upwards. This range includes all values and subranges therebetween, including 0.01, 0.05, 0.1, 0.5, 1, 1.5, 2, 5, 7, 10, 15, 20, 25 mol/L and higher. In one embodiment, the water solubility of the divalent metal salt is 0.1 mol/L or greater.

The composition contains one or more complexing agents. So long as it has an affinity for the divalent metal (ion), the complexing agent is not particularly limited. In this regard, the complexing agent may be any compound, molecule, or the like that has a chemical, physical, or physicochemical affinity for the divalent metal. Examples of such affinities include, but should not be considered to be limited to chelation, electron donation, Van der Waals attraction, physisorption, chemisorption, ion-pairing, ionic, electrostatic, metal-ligand, steric, and the like. The affinity may be reversible or irreversible. In one embodiment, the affinity results in an association between the complexing agent and the divalent metal, to form an associated complex.

The associated complex may be neutrally charged, or it may have a positive or slightly positive charge. The associated complex may arise from any number of divalent metal ions associated with any number of complexing agents. The ratio of metal to complexing agent may suitably range from 10:1 to 1:10, or any value or subrange therebetween, including any one of 10, 9, 8, 7, 6, 5, 4, 3, 2, 1 to any one of 1, 2, 3, 4, 5, 6, 7, 8, 9, 10.

In one embodiment, the water solubility of the associated complex that results from the association may suitably range from slightly or moderately soluble to soluble, measured as a saturated aqueous solution of the associated complex at room temperature. The water solubility may range from 0.01 mol/L and upwards. This range includes all values and subranges therebetween, including 0.01, 0.05, 0.1, 0.5, 1, 1.5, 2, 5, 7, 10, 15, 20, 25 mol/L and higher. In one embodiment, the water solubility of the associated complex is 0.1 mol/L or greater.

The associated complex may be colorless or it may have color. It may be advantageous in some applications that the associated complex is both water-soluble and colorless.

In one embodiment the associated complex is compatible with the optical brightening agent either in the solution phase or in the solid phase, or both. So long as there is some association and/or interaction between the complexing agent and the divalent metal, the nature of the affinity is not particularly limited.

Without wishing to be bound by theory, it is hypothesized that the complexing agent may "encage" the divalent metal ion while still leaving some excess positive charge on the metal ion which will contribute to good ink fixation. It is also possible that complex cage-type associations, which contain sufficient organic molecular surfaces, would be more compatible with the optical brightening agent (for example preventing the optical brightening agent from precipitating from solution) than the metal ion alone would be with the optical brightening agent.

In one embodiment, the complexing agent may include one or more electron donating atoms such as nitrogen, oxygen, phosphorus, sulfur, and the like.

Some examples of complexing agents include organic phosphonate, phosphate, carboxylic acid, dithiocarbamate, EDTA salt, EGTA salt, DTPA salt, crown ether, EDTA (CAS 60-00-4), EDTA disodium salt [6381-92-6], EDTA tetrasodium salt [194491-31-1], EDTA trisodium salt, EDTA disodium magnesium salt [14402-88-1], EDTA disodium calcium salt, EDTA diammonium salt [20824-56-0], EDTA dipotassium salt [25102-12-9], EDTA tripotassium salt [65501-24-8], EDTA dilithium salt [14531-56-7], EDTA tetramethylammonium salt, EDTA calcium salt, EDTA magnesium salt, EDTA aluminum salt, polyacrylic acid, polyacrylic acid salt, polysorbate, poly-4-styrene sulfonic acid salt, glycerol formal, formamidinesulinic acid, sodium hypophosphite, potassium hypophosphite, calcium hypophosphite, organic phosphonate, organic phosphate, carboxylic acid, dithiocarbamate, sorbitol, sorbic acid, cellulose ether, CMC cellulose, hydroxyethyl cellulose, PEG, PEG derivatives, PPG, PPG derivatives, ionic liquids, 1-butyl-3-methyl-imidazolium-thiocyanate, and salts thereof. Combinations are possible.

Examples of ionic liquids include those based on alkyl imidazolium, ie. methyl imidazolium (such as from BASF) and phosphonium salts (such as from Cytec). The anions could be halides, sulfates or alkyl sulfates, tetrachloroaluminate, acetate, thiocyanates, salicylates, hexafluorophosphates, hexafluoroborates, dioctylsulfosuccinate, decanoate, dodecylbenzenesulfonate. Further common examples of alkyl imidazoliums may include, but are not limited to, 1-ethyl-3-methylimidazolium thiocyanate, 1-ethyl-3-methylimidazolium acetate, 1-ethyl-3-methylimidazolium methyl sulfate, 1-butyl-3-methylimidazolium thiocyanate (or acetate, or methyl sulfate, or ethyl sulfate).

In some embodiments, it may be advantageous to use EDTA (CAS 60-00-4), EDTA disodium salt [6381-92-6], EDTA tetrasodium salt [194491-31-1], EDTA trisodium salt, EDTA disodium magnesium salt [14402-88-1], EDTA disodium calcium salt, either alone, or in combination, as the complexing agent.

In one embodiment, the term, "organic phosphonate" may refer to organic derivatives of phosphonic acid, $HP(O)(OH)_2$, containing a single C—P bond, such as HEDP ($CH_3C(OH)(P(O)(OH)_2)$), 1-hydroxy-1,3-propanediylbis-phosphonic acid ($(HO)_2P(O)CH(OH)CH_2CH_2P(O)(OH)_2)$); preferably containing a single C—N bond adjacent (vicinal) to the C—P bond, such as DTMPA ($(HO)_2P(O)CH_2N[CH_2CH_2N(CH_2P(O)(OH)_2)_2]_2$), AMP($N(CH_2P(O)(OH)_2)_3$), PAPEMP (($(HO)_2P(O)CH_2)_2NCH(CH_3)CH_2(OCH_2CH(CH_3))_2N(CH_2)_6N(CH_2P(O)(OH)_2)_2$), HMDTMP ($(HO)_2P(O)CH_2)_2N(CH_2)_6N(CH_2P(O)(OH)_2)_2$), HEBMP($N(CH_2P(O)(OH)_2)_2CH_2CH_2OH$), salts thereof, and the like. Combinations are possible.

In one embodiment, the term, "organic phosphates" may refer to organic derivatives of phosphorous acid, $P(O)(OH)_3$, containing a single C—P bond, including triethanolamine tri(phosphate ester) ($N(CH_2CH_2OP(O)(OH)_2)_3$), salts thereof, and the like. Combinations are possible.

In one embodiment, the term, "carboxylic acids" may refer to organic compounds containing one or more carboxylic group(s), —C(O)OH, preferably aminocarboxylic acids containing a single C—N bond adjacent (vicinal) to the C—CO_2H bond, such as EDTA (($(HO_2CCH_2)_2NCH_2CH_2N(CH_2CO_2H)_2$), DTPA (($(HO_2CCH_2)_2NCH_2CH_2N(CH_2CO_2H)CH_2CH_2N(CH_2CO_2H)_2$), and the like and alkaline and alkaline earth metal salts thereof. Combinations are possible.

In one embodiment, the term, "dithiocarbamates" may refer to monomeric dithiocarbamates, polymeric dithiocarbamates, polydiallylamine dithiocarbamates, 2,4,6-trimercapto-1,3,5-triazine, disodium ethylenebisdithiocarbamate, disodium dimethyldithiocarbamate, salts thereof, and the like. Combinations are possible.

In one embodiment, the complexing agent is a phosphonate. In one embodiment, the phosphonate is diethylenetriamine-pentamethylene phosphonic acid (DTMPA) and salts thereof.

In one embodiment, the complexing agent is a carboxylic acid. In one embodiment, the carboxylate is selected from diethylenetriaminepentaacetic acid (DTPA) and salts thereof and ethylenediaminetetraacetic acid (EDTA) and salts thereof.

In one embodiment, the complexing agent is one or more ionic liquids. An example of an ionic liquid is 1-butyl-3-methyl-imidazolium-thiocyanate. In another embodiment, the complexing agent is a combination of an ionic liquid and another (non ionic liquid) complexing agent.

The amount of complexing agent is not particularly limiting. When starch is used in a sizing formulation, the complexing agent may be present in an amount ranging from about 0.01 Lb/100 Lb starch to about 100 Lb/100 Lb starch. This range includes all values and subranges therebetween, including about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 10, 15, 20, 25, 30, 35, 40, 45, 50, 55, 60, 65, 70, 75, 80, 85, 90, 95, 99, and 100 Lb complexing agent/100 Lb starch. If no starch is used, then the complexing agent may be present in an amount ranging from about 0.01 Lb/ton of paper to about 100 Lb/ton of paper. This range includes all values and subranges therebetween, including about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 10, 15, 20, 25, 30, 35, 40, 45, 50, 55, 60, 65, 70, 75, 80, 85, 90, 95, 99, and 100 Lb complexing agent/ton of paper. In one embodiment, the amount of complexing agent ranges from about 0.1 to about 10 Lbs/ton of paper.

The composition contains one or more optical brightening agents, sometimes referred to herein as optical brighteners or OBAs. Typically, the optical brightening agents are fluorescent dyes or pigments that absorb ultraviolet radiation and reemit it at a higher wavelengths in the visible spectrum (blue), thereby effecting a white, bright appearance to the paper sheet when added to the stock furnish. Representative optical brighteners include, but are not limited to azoles, biphenyls, coumarins, furans, stilbenes, ionic brighteners, including anionic, cationic, and anionic (neutral) compounds, such as the Eccobrite™ and Eccowhite™ compounds available from Eastern Color & Chemical Co. (Providence, R.I.); naphthalimides; pyrazenes; substituted (e.g., sulfonated) stilbenes, such as the Leucophor™ range of optical brighteners available from the Clariant Corporation (Muttenz, Switzerland), and Tinopal™ from Ciba Specialty Chemicals (Basel, Switzerland); salts of such compounds including but not limited to alkali metal salts, alkaline earth metal salts, transition metal salts, organic salts and ammonium salts of such brightening agents; and combinations of one or more of the foregoing agents.

In one embodiment, the optical brighteners are selected from the group including disulfonated, tetrasulfonated, and hexasulfonated stilbene-based OBAs, and combinations thereof.

In one embodiment, an effective dosage of divalent metal salt, complexing agent, and optical brightener is the amount necessary to achieve the desired brightness and whiteness yet maintain good ink and printing properties.

The amount of optical brightening agent is not particularly limited so long as the desirable whiteness and/or brightness is obtained, which is easily determined by one of ordinary skill in the papermaking art. When used in a sizing composition, the optical brighteners may be added in any amount ranging from 10 to 100 pounds per 100 pounds of sizing agent (e.g., ethylated starch). This range includes all values and subranges therebetween, including 10, 15, 20, 25, 30, 35, 40, 45, 50, 55, 60, 65, 70, 75, 80, 85, 90, 95 and 100 pounds. In another embodiment, the optical brightening agent may be added in amounts ranging from about 0.005 to about 4 weight percent based on the weight of the paper product, such as a recording sheet. This range includes all values and subranges therebetween, including about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, and 4 weight percent based on the weight of the paper product.

For example, the composition can be added to bleached pulp or paper product at any point in the paper manufacturing process. Some examples of addition points include, but are not limited to (a) to the pulp slurry in the latency chest; (b) to the pulp during or after the bleaching stage in a storage, blending or transfer chest; (c) adding EDTA or DTPA before the final debleaching stage where the pH is alkaline (and upon bleaching by the final D stage, the pH will drop which will immobilize the complexing agent inside or upon the pulp fiber); (d) to pulp after bleaching, washing and dewatering followed by cylinder or flash drying; (e) before or after the cleaners; (f) before or after the fan pump to the paper machine headbox; (g) to the paper machine white water; (h) sprayed or showered onto the moving wet web after head box forming but before wet press; (i) to the silo or save all; (j) in the press section using, for example, a size press, coater or spray bar; (k) in the drying section using, for example, a size press, coater or spray bar; (l) on the calender using a wafer box; (m) on paper in an off-machine coater or size press; and/or (n) in the curl control unit. Combinations are possible.

The precise location where the composition is added will depend on the specific equipment involved, the exact process conditions being used and the like. In some cases, one or more of the divalent metal salt, complexing agent, and optical brightening agent may be added at one or more locations for optimal effectiveness.

Application can be by any means conventionally used in papermaking processes, including by "split-feeding" whereby one or more of the divalent metal salt, complexing agent, and optical brightening agent is/are applied at one point in the papermaking process, for example on pulp or a wet sheet (before the dryers) and the remaining portion of one or more of the divalent metal salt, complexing agent, and optical brightening agent is added at a subsequent point, for example in the size press.

In one embodiment, the complexing agent and/or optical brightener can be added to a bleached pulp or paper product before, after or simultaneously with the divalent metal salt. The optical brightener and/or complexing agent may also be formulated with the divalent metal salt.

In another embodiment, the composition may be mixed with a surface sizing solution and applied in the size press.

In one embodiment, the composition is applied to a paper substrate to produce a recording sheet. The paper substrate suitably comprises a plurality of cellulosic fibers. The type of cellulosic fiber is not critical, and any such fiber known or suitable for use in papermaking can be used. For example, the substrate can made from pulp fibers derived from hardwood trees, softwood trees, or a combination of hardwood and softwood trees. The fibers may be prepared for use in a papermaking furnish by one or more known or suitable digestion, refining, and/or bleaching operations such as, for example, known mechanical, thermomechanical, chemical and/or semichemical pulping and/or other well known pulping processes. The term, "hardwood pulps" as may be used herein include fibrous pulp derived from the woody substance of deciduous trees (angiosperms) such as birch, oak, beech, maple, and eucalyptus. The term, "softwood pulps" as may be used herein include fibrous pulps derived from the woody substance of coniferous trees (gymnosperms) such as varieties of fir, spruce, and pine, as for example loblolly pine, slash pine, Colorado spruce, balsam fir and Douglas fir. In some embodiments, at least a portion of the pulp fibers may be provided from non-woody herbaceous plants including, but not limited to, kenaf, hemp, jute, flax, sisal, or abaca, although legal restrictions and other considerations may make the utilization of hemp and other fiber sources impractical or impossible. Either bleached or unbleached pulp fiber may be utilized. Recycled pulp fibers are also suitable for use.

The paper substrate may suitably contain from 1 to 99 wt % of cellulosic fibers based upon the total weight of the substrate. In one embodiment, the paper substrate may contain from 5 to 95 wt % of cellulosic fibers based upon the total weight of the substrate. These ranges include any and all values and subranges therebetween, for example, 1, 5, 10, 15, 20, 25, 30, 35, 40, 45, 50, 55, 60, 65, 70, 75, 80, 85, 90, 95 and 99 wt %.

The paper substrate may optionally contain from 1 to 100 wt % cellulosic fibers originating from softwood species based upon the total amount of cellulosic fibers in the paper substrate. In one embodiment, the paper substrate may contain 10 to 60 wt % cellulosic fibers originating from softwood species based upon the total amount of cellulosic fibers in the paper substrate. These ranges include 1, 2, 5, 10, 15, 20, 25, 30, 35, 40, 45, 50, 55, 60, 65, 70, 75, 80, 85, 90, 95, and 100 wt % and any and all ranges and subranges therein, based upon the total amount of cellulosic fibers in the paper substrate.

In one embodiment, the paper substrate may alternatively or overlappingly contain from 0.01 to 99 wt % fibers from softwood species, based on the total weight of the paper substrate. In another embodiment, the paper substrate may contain from 10 to 60 wt % fibers from softwood species based upon the total weight of the paper substrate. These ranges include any and all values and subranges therein. For example, the paper substrate may contain not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 99 wt % softwood based upon the total weight of the paper substrate.

All or part of the softwood fibers may optionally originate from softwood species having a Canadian Standard Freeness (CSF) of from 300 to 750. In one embodiment, the paper substrate contains fibers from a softwood species having a CSF from 400 to 550. These ranges include any and all values and subranges therebetwen, for example, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF. Canadian Standard Freeness is as measured by TAPPI T-227 standard test.

The paper substrate may optionally contain from 1 to 100 wt % cellulosic fibers originating from hardwood species based upon the total amount of cellulosic fibers in the paper substrate. In one embodiment, the paper substrate may contain from 30 to 90 wt % cellulosic fibers originating from hardwood species, based upon the total amount of cellulosic fibers in the paper substrate. These ranges include 1, 2, 5, 10, 15, 20, 25, 30, 35, 40, 45, 50, 55, 60, 65, 70, 75, 80, 85, 90, 95, and 100 wt %, and any and all values and subranges therein, based upon the total amount of cellulosic fibers in the paper substrate.

In one embodiment, the paper substrate may alternatively or overlappingly contain from 0.01 to 99 wt % fibers from hardwood species, based upon the total weight of the paper substrate. In another embodiment, the paper substrate may alternatively or overlappingly contain from 60 to 90 wt % fibers from hardwood species, based upon the total weight of the paper substrate. These ranges include any and all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95, 99 and 99 wt %, based upon the total weight of the paper substrate.

All or part of the hardwood fibers may optionally originate from hardwood species having a Canadian Standard Freeness of from 300 to 750. In one embodiment, the paper substrate may contain fibers from hardwood species having CSF values of from 400 to 550. These ranges include 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF, and any and all ranges and subranges therein.

The paper substrate may optionally contain less refined fibers, for example, less refined softwood fibers, less refined hardwood, or both. Combinations of less refined and more refined fibers are possible. In one embodiment, the paper substrate contains fibers that are at least 2% less refined than that of fibers used in conventional paper substrates. This range includes all values and subranges therebetween, including at least 2, 5, 10, 15, and 20%. For example, if a conventional paper contains fibers, softwood and/or hardwood, having a Canadian Standard Freeness of 350, then, in one embodiment, the paper substrate may contain fibers having a CSF of 385 (i.e. refined 10% less than conventional) and still perform similar, if not better, than the conventional paper. Nonlimiting examples of some performance qualities of the paper substrate are discussed below. Examples of some reductions in refining of hardwood and/or softwood fibers include, but are not limited to: 1) from 350 to at least 385 CSF; 2) from 350 to at least 400 CSF; 3) from 400 to at least 450 CSF; and 4) from 450 to at least 500 CSF. In some embodiments, the reduction in fiber refinement may be at least 2, 3, 4, 5, 6, 7, 8, 9, 10, 11, 12, 13, 14, 15, 16, 17, 18, 19, 20, and 25% reduction in refining compared to those fibers in conventional paper substrates.

When the paper substrate contains both hardwood fibers and softwood fibers, the hardwood/softwood fiber weight ratio may optionally range from 0.001 to 1000. In one embodiment, the hardwood/softwood ratio may range from 90/10 to 30/60. These ranges include all values and subranges therebetween, including 0.001, 0.002, 0.005, 0.01, 0.02, 0.05, 0.1, 0.2, 0.5, 1, 2, 5, 10, 15, 20, 25, 30, 35, 40, 45, 50, 55, 60, 65, 70, 75, 80, 85, 90, 95, 100, 200, 300, 400, 500, 600, 700, 800, 900, and 1000.

The softwood fibers, hardwood fibers, or both may be optionally modified by physical and/or chemical processes. Examples of physical processes include, but are not limited to, electromagnetic and mechanical processes. Examples of electrical modifications include, but are not limited to, processes involving contacting the fibers with an electromagnetic energy source such as light and/or electrical current. Examples of mechanical modifications include, but are not limited to, processes involving contacting an inanimate object with the fibers. Examples of such inanimate objects include those with sharp and/or dull edges. Such processes also involve, for example, cutting, kneading, pounding, impaling, and the like, and combinations thereof.

Nonlimiting examples of chemical modifications include conventional chemical fiber processes such as crosslinking and/or precipitation of complexes thereon. Other examples of suitable modifications of fibers include those found in U.S. Pat. Nos. 6,592,717, 6,592,712, 6,582,557, 6,579,415, 6,579, 414, 6,506,282, 6,471,824, 6,361,651, 6,146,494, H1,704, 5,731,080, 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, the entire contents of each of which are hereby incorporated, independently, by reference. Still other examples of suitable modifications of fibers may be found in U.S. Application Nos. 60/654,712, filed Feb. 19, 2005, and Ser. No. 11/358,543, filed Feb. 21, 2006, which may include the further addition of optical brighteners (i.e. OBAs) as discussed therein, the entire contents of each of which are hereby incorporated, independently, by reference.

The paper substrate may optionally include "fines." "Fines" fibers are typically those fibers with average lengths of not more than about 100 μm. Sources of "fines" may be found in SaveAll fibers, recirculated streams, reject streams, waste fiber streams, and combinations thereof. The amount of "fines" present in the paper substrate can be modified, for example, by tailoring the rate at which streams are added to the paper making process. In one embodiment, the average lengths of the fines are not more than about 5, 10, 15, 20, 25, 30, 35, 40, 45, 50, 55, 60, 65, 70, 75, 80, 85, 90, 95, and 100 μm, including any and all ranges and subranges therein.

If used, the "fines" fibers may be present in the paper substrate together with hardwood fibers, softwood fibers, or both hardwood and softwood fibers.

The paper substrate may optionally contain from 0.01 to 100 wt % fines, based on the total weight of the paper substrate. In one embodiment, the paper substrate may contain from 0.01 to 50 wt % fines, based upon the total weight of the substrate. These ranges include all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines, based upon the total weight of the paper substrate.

In one embodiment, the paper substrate may alternatively or overlappingly contain from 0.01 to 100 wt % fines, based upon the total weight of the fibers in the paper substrate. This range includes all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines, based upon the total weight of the fibers in by the paper substrate.

If desired, the recording sheet may contain at least one sizing agent in addition to the composition. The sizing agent is not particularly limited, and any conventional papermaking sizing agent may be used. The sizing agent may be nonreactive, reactive, or a combination of nonreactive and reactive. The sizing agent may, optionally and if desired, impart a moisture or water-resistance in varying degrees to the paper substrate. Non-limiting examples of sizing agents can be found in the "Handbook for Pulp and Paper Technologists" by G. A. Smook (1992), Angus Wilde Publications, which is hereby incorporated, in its entirety, by reference. Preferably, the sizing agent is a surface sizing agent. Preferable examples of sizing agents are starch, alkyl ketene dimer (AKD), alkenyl ketene dimer (ALKD), alkenyl succinic anhydride (ASA), ASA/ALKD, styrene acrylic emulsion (SAE) polyvinyl alcohol (PVOH), polyvinylamine, alginate, carboxymethyl cellulose, etc. However, any sizing agent may be used. See, for example, the sizing agents disclosed in U.S. Pat. No. 6,207,258, the entire contents of which are hereby incorporated by reference.

Many nonreactive sizing agents are known in the art. Examples include, without limitation, BASOPLAST® 335D nonreactive polymeric surface size emulsion from BASF Corporation (Mt. Olive, N.J.), FLEXBOND® 325 emulsion of a copolymer of vinyl acetate and butyl acrylate from Air Products and Chemicals, Inc. (Trexlertown, Pa.), and PENTAPRINT® nonreactive sizing agents (disclosed for example in Published International Patent Application Publication No. WO 97/45590, published Dec. 4, 1997, corresponding to U.S. patent application Ser. No. 08/861,925, filed May 22, 1997, the entire contents of which are hereby incorporated by reference) from Hercules Incorporated (Wilmington, Del.), to name a few.

For papermaking carried out under alkaline pH manufacturing conditions, sizing agents based on alkyl ketene dimers (AKDs) or alkenyl ketene dimers (ALKDs) or multimers and alkenyl succinic anhydride (ASA) sizing agents may be suitably used. Combinations of these and other sizing agents may also be employed.

Ketene dimers used as sizing agents for papermaking are well known. AKDs, containing one β-lactone ring, are typically prepared by the dimerization of alkyl ketenes made from two fatty acid chlorides. Commercial alkyl ketene dimer sizing agents are often prepared from palmitic and/or stearic fatty acids, e.g. Hercon® and Aquapel® sizing agents (both from Hercules Incorporated).

Alkenyl ketene dimer sizing agents are also commercially available, e.g. Precise sizing agents (Hercules Incorporated).

U.S. Pat. No. 4,017,431, the entire contents of which are hereby incorporated by reference, provides a nonlimiting exemplary disclosure of AKD sizing agents with wax blends and water soluble cationic resins.

Ketene multimers containing more than one β-lactone ring may also be employed as sizing agents.

Sizing agents prepared from a mixture of mono- and dicarboxylic acids, have been disclosed as sizing agents for paper in Japanese Kokai Nos. 168991/89 and 168992/89.

European patent application Publication No. 0 629 741 A1 discloses alkyl ketene dimer and multimer mixtures as sizing agents in paper used in high speed converting and reprographic machines. The alkyl ketene multimers are made from the reaction of a molar excess of monocarboxylic acid, typically a fatty acid, with a dicarboxylic acid. These multimer compounds are solids at 25° C.

European patent application Publication No. 0 666 368 A2 and Bottorff et al. in U.S. Pat. No. 5,685,815, the entire contents of which are hereby incorporated by reference, disclose paper for high speed or reprographic operations that is internally sized with an alkyl or alkenyl ketene dimer and/or multimer sizing agent. The preferred 2-oxetanone multimers are prepared with fatty acid to diacid ratios ranging from 1:1 to 3.5:1.

Commercial ASA-based sizing agents are dispersions or emulsions of materials that may be prepared by the reaction of maleic anhydride with an olefin ($C_{14}$-$C_{18}$).

Examples of hydrophobic acid anhydrides useful as sizing agents for paper include:

(i) rosin anhydride (see U.S. Pat. No. 3,582,464, for example, the entire contents of which are hereby incorporated by reference);

(ii) anhydrides having the structure (I):

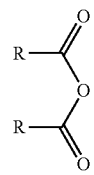

where each R is the same or a different hydrocarbon radical; and (iii) cyclic dicarboxylic acid anhydrides, such as those having the structure (II):

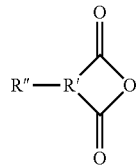

where R' represents a dimethylene or trimethylene radical and where R" is a hydrocarbon radical.

Some examples of anhydrides of formula (I) include myristoyl anhydride; palmitoyl anhydride; olcoyl anhydride; and stearoyl anhydride.

Examples of substituted cyclic dicarboxylic acid anhydrides falling within the above formula (II) include substituted succinic, glutaric anhydrides, i- and n-octadecenyl succinic acid anhydride; i- and n-hexadecenyl succinic acid anhydride; i- and n-tetradecenyl succinic acid anhydride, dodecyl succinic acid anhydride; decenyl succinic acid anhydride; ectenyl succinic acid anhydride; and heptyl glutaric acid anhydride.

Other examples of nonreactive sizing agents include a polymer emulsion, a cationic polymer emulsion, an amphoteric polymer emulsion, polymer emulsion wherein at least one monomer is selected from the group including styrene, α-methylstyrene, acrylate with an ester substituent with 1 to 13 carbon atoms, methacrylate having an ester substituent with 1 to 13 carbon atoms, acrylonitrile, methacrylonitrile, vinyl acetate, ethylene and butadiene; and optionally including acrylic acid, methacrylic acid, maleic anhydride, esters of maleic anhydride or mixtures thereof, with an acid number less than about 80, and mixtures thereof.

If desired, the polymer emulsion may stabilized by a stabilizer predominantly including degraded starch, such as that disclosed, for example, in U.S. Pat. Nos. 4,835,212, 4,855,343, and 5,358,998, the entire contents of each of which are hereby incorporated by reference. If desired, a polymer emulsion may be used in which the polymer has a glass transition temperature of about −15° C. to about 50° C.

For traditional acid pH papermaking conditions, nonreactive sizing agents in the form of dispersed rosin sizing agents may be suitably used. Dispersed rosin sizing agents are well known. Nonlimiting examples of rosin sizing agents are disclosed in, for example, U.S. Pat. Nos. 3,966,654 and 4,263,182, the entire contents of each of which are hereby incorporated by reference.

The rosin may be any modified or unmodified, dispersible or emulsifiable rosin suitable for sizing paper, including unfortified rosin, fortified rosin and extended rosin, as well as rosin esters, and mixtures and blends thereof. As used herein, the term "rosin" means any of these forms of dispersed rosin useful in a sizing agent.

The rosin in dispersed form is not particularly limited, and any of the commercially available types of rosin, such as wood rosin, gum rosin, tall oil rosin, and mixtures of any two or more, in their crude or refined state, may be used. In one embodiment, tall oil rosin and gum rosin are used. Partially hydrogenated rosins and polymerized rosins, as well as rosins that have been treated to inhibit crystallization, such as by heat treatment or reaction with formaldehyde, may also be employed.

The fortified rosin is not particularly limited. One example of such a rosin includes the adduct reaction product of rosin and an acidic compound containing the

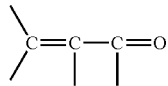

group and is derived by reacting rosin and the acidic compound at elevated temperatures of from about 150° C. to about 210° C.

The amount of acidic compound employed will be that amount which will provide fortified rosin containing from about 1% to about 16% by weight of adducted acidic compound based on the weight of the fortified rosin. Methods of preparing fortified rosin are well known to those skilled in the art. See, for example, the methods disclosed and described in U.S. Pat. Nos. 2,628,918 and 2,684,300, the entire contents of each of which are hereby incorporated by reference.

Examples of acidic compounds containing the

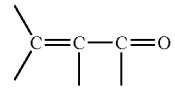

group that can be used to prepare the fortified rosin include the α-β-unsaturated organic acids and their available anhydrides, specific examples of which include fumaric acid, maleic acid, acrylic acid, maleic anhydride, itaconic acid, itaconic anhydride, citraconic acid and citraconic anhydride. Mixtures of acids can be used to prepare the fortified rosin if desired.

Thus, for example, a mixture of the acrylic acid adduct of rosin and the fumaric acid adduct can be used to prepare a dispersed rosin sizing agent. Also, fortified rosin that has been substantially completely hydrogenated after adduct formation can be used.

Rosin esters may also be used in the dispersed rosin sizing agents. Suitable exemplary rosin esters may be rosin esterified as disclosed in U.S. Pat. No. 4,540,635 (Ronge et al.) or U.S. Pat. No. 5,201,944 (Nakata et al.), the entire contents of each of which are hereby incorporated by reference.

The unfortified or fortified rosin or rosin esters can be extended if desired by known extenders such as waxes (particularly paraffin wax and microcrystalline wax); hydrocarbon resins including those derived from petroleum hydrocarbons and terpenes; and the like. This may be suitably accomplished by melt blending or solution blending with the rosin or fortified rosin from about 10% to about 100% by weight, based on the weight of rosin or fortified rosin, of the extender.

Blends of fortified rosin and unfortified rosin; blends of fortified rosin, unfortified rosin, rosin esters and rosin extender can be used. Blends of fortified and unfortified rosin may include, for example, about 25% to 95% fortified rosin and about 75% to 5% unfortified rosin. Blends of fortified rosin, unfortified rosin, and rosin extender may include, for example, about 5% to 45% fortified rosin, 0 to 50% rosin, and about 5% to 90% rosin extender.

Hydrophobic organic isocyanates, e.g., alkylated isocyanates, may also be used as sizing agents.

Other conventional paper sizing agents include alkyl carbamoyl chlorides, alkylated melamines such as stearylated melamines, and styrene acrylates.

Mixtures of sizing agents are possible.

An external sizing agent or both internal and surface sizing agents may be used. Either or both may contain the divalent metal salt, the optical brightening agent, and the complexing agent. When both internal and external sizing agents are present, they may be present in any weight ratio and may be the same and/or different. In one embodiment, the weight ratio of surface sizing agent to internal sizing agent is from 50/50 to 100/0, more preferably from 75/25 to 100/0 surface/internal sizing agent. This range includes 50/50, 55/45, 60/40, 65/35, 70/30, 75/25, 80/20, 85/15, 90/10, 95/5 and 100/0, including any and all ranges and subranges therein. A preferred example of an internal sizing agent is alkenyl succinic anhydride (ASA).

When starch is used as a sizing agent, starch may be modified or unmodified. Examples of starch may be found in the "Handbook for Pulp and Paper Technologists" by G. A. Smook (1992), Angus Wilde Publications, mentioned above. Preferable examples of modified starches include, for example, oxidized, cationic, ethylated, hydroethoxylated, etc. In addition, the starch may come from any source, preferably potato and/or corn. Most preferably, the starch source is corn.

In one embodiment, a mixture comprising calcium chloride, complexing agent, optical brightening agent, and one or more starches is in contact with at least one surface of the substrate. Illustrative of useful starches include naturally occurring carbohydrates synthesized in corn, tapioca, potato and other plants by polymerization of dextrose units. All such starches and modified forms thereof such as starch acetates, starch esters, starch ethers, starch phosphates, starch xanthates, anionic starches, cationic starches, oxidized starches, and the like which can be derived by reacting the starch with a suitable chemical or enzymatic reagent can be used. If desired, starches may be prepared by known techniques or obtained from commercial sources. For example, one example of a commercial starches include Ethylex 2035 from A. E. Staley, PG-280 from Penford Products, oxidized corn starches from ADM, Cargill, and Raisio, and enzyme converted starches such as Amyzet 150 from Amylum.

Modified starches may be used. Non-limiting examples of a type of modified starches include cationic modified chemically modified starches such as ethylated starches, oxidized starches, and AP and enzyme converted Pearl starches. Most preferred are chemically modified starches such as ethylated starches, oxidized starches, and AP and enzyme converted Pearl starches.

In one embodiment, a water soluble metal salt, for example, calcium chloride, and Ethylex 2035 starch together with a complexing agent and an optical brightening agent are used in a sizing formulation applied to both sides of a sheet of paper, and an improved dry time of the sheet is obtained when the weight ratio of the calcium chloride to the starch is equal to or greater than about 0.5 to about 20%. This range includes all values and subranges therebetween, including 0.5, 0.6, 0.7, 0.8, 0.9, 1, 1.5, 2, 3, 4, 5, 6, 7, 8, 9, 10, 11, 12, 13, 14, 15, 16, 17, 18, 19, and 20%, and any combination thereof. In one embodiment, the weight ratio of the calcium chloride to the starch may range from about 0.5 to about 18%. In another embodiment, the weight ratio may range from about 0.75 to about 17%. In another embodiment, the weight ratio may range from about 1% to about 16%. The weight ratios of the calcium chloride to the starch may be one-half of those stated if the starch/salt mixture is only applied to one side of the paper, and starch without salt is applied to the other side. In this case, the improved print properties would only be expected on the side of the paper containing the salt.

The amount of divalent water soluble metal salt and one or more starches in and/or on the substrate may vary widely, and any conventional amount can be used.

When polyvinyl alcohol is used as a sizing agent, it may have any % hydrolysis. Preferable polyvinyl alcohols are those having a % hydrolysis ranging from 100% to 75%. The % hydrolysis of the polyvinyl alcohol may be 75, 76, 78, 80, 82, 84, 85, 86, 88, 90, 92, 94, 95, 96, 98, and 100% hydrolysis, including any and all ranges and subranges therein.

The paper substrate may contain PVOH at any wt %. Preferably, when PVOH is present, it is present at an amount from 0.001 wt % to 100 wt % based on the total weight of sizing agent contained in and/or on the substrate. This range includes 0.001, 0.002, 0.005, 0.006, 0.008, 0.01, 0.02, 0.03, 0.04, 0.05, 0.1, 0.2, 0.4, 0.5, 0.6, 0.7, 0.8, 0.9, 1, 2, 4, 5, 6, 8, 10, 12, 14, 15, 16, 18, 20, 25, 30, 35, 40, 45, 50, 55, 60, 65, 70, 75, 80, 85, 90, 95, and 100 wt % based on the total weight of sizing agent in the substrate, including any and all ranges and subranges therein.

The sizing agent may also include one or more optional additives such as binders, pigments, thickeners, defoamers, surfactants, slip agents, dispersants, optical brighteners, dyes, and preservatives, which are well-known. Examples of pigments include, but are not limited to, clay, calcium carbonate, calcium sulfate hemihydrate, and calcium sulfate dehydrate, chalk, GCC, PCC, and the like. A preferable pigment is calcium carbonate with the preferred form being precipitated calcium carbonate. Examples of binders include, but are not limited to, polyvinyl alcohol, Amres (a Kymene type), Bayer Parez, polychloride emulsion, modified starch such as hydroxyethyl starch, starch, polyacrylamide, modified polyacrylamide, polyol, polyol carbonyl adduct, ethanedial/polyol condensate, polyamide, epichlorohydrin, glyoxal, glyoxal urea, ethanedial, aliphatic polyisocyanate, isocyanate, 1,6 hexamethylene diisocyanate, diisocyanate, polyisocyanate, polyester, polyester resin, polyacrylate, polyacrylate resin, acrylate, and methacrylate. Other optional additives include, but are not limited to silicas such as colloids and/or sols. Examples of silicas include, but are not limited to, sodium silicate and/or borosilicates. Other additives which may be used include one or more solvents such as, for example, water. Combinations of additives are possible.

It may be advantageous that a majority of the total amount of sizing agent is located at or near the outside surface or surfaces (in the case of the sizing applied to both surfaces) of the paper substrate. In one embodiment, the paper substrate contains the sizing agent such that they (the substrate and the sizing agent) cooperate to form an I-beam structure. I-beam structures are discussed, for example, in U.S. Patent Publication Nos. 2004/0065423, published Apr. 8, 2004, and 2008/0035292 filed Jan. 7, 2007, as well as in the US Provisional Application filed Mar. 31, 2008, and having Application Ser. No. 61/040,806, the entire contents of each of which are hereby incorporated by reference. In this regard, it is not required that the sizing agent interpenetrate with the cellulosic fibers of the substrate. However, if the sizing or coating layer and the cellulose fibers interpenetrate, it will create a paper substrate having an interpenetration layer, which is within the ambit of the present invention.

In one embodiment, the interpenetration layer of the paper substrate may define a region in which at least the sizing solution penetrates into and is among the cellulose fibers. The interpenetration layer may be from 1 to 99% of the entire cross section of at least a portion of the paper substrate, including 1, 2, 5, 10, 15, 20, 25, 30, 35, 40, 45, 50, 55, 60, 65, 70, 75, 80, 85, 90, 95, and 99% of the paper substrate, including any and all ranges and subranges therein. Such an embodiment may be made, for example, when a sizing solution is added to the cellulose fibers prior to a coating method and may be combined with a subsequent coating method if required. Addition points may be at the size press, for example.

In one embodiment, the cross-sectional thickness of the interpenetration layer may be minimized. Alternatively, or additionally, the concentration of the sizing agent preferably increases as one moves (in the z-direction normal to the plane of the substrate) from the interior portion towards the surface of the paper substrate. Therefore, the amount of sizing agent present towards the top and/or bottom outer surfaces of the substrate may be greater than the amount of sizing agent present towards the inner middle of paper substrate. Alternatively, a majority percentage of the sizing agent may preferably be located at a distance from the outside surface of the substrate that is equal to or less than 25%, more preferably 10%, of the total thickness of the substrate. This aspect may also be known as the $Q_{total}$, which is measured by known methodologies outlined, for example, in U.S. Patent Publication No. 2008/0035292, published Feb. 14, 2008, the entire contents of which are hereby incorporated by reference. If $Q_{total}$ equal to 0.5, then the sizing agent is approximately evenly distributed throughout the paper substrate. If $Q_{total}$ is total is greater than 0.5, then there is more sizing agent towards the central portion (measured by the z-direction normal to the plane of the substrate) of the paper substrate than towards the paper substrate's surface or surfaces. If $Q_{total}$ is less than 0.5, then there is less sizing agent towards the central portion of the paper substrate than towards the paper substrate's surface or surfaces. In light of the above, the paper substrate preferably has a $Q_{total}$ that is less than 0.5, preferably less than 0.4, more preferably less than 0.3, most preferably less than 0.25. Accordingly the $Q_{total}$ of the paper substrate may be from 0 to less than 0.5. This range includes 0, 0.001, 0.002, 0.005, 0.01, 0.02, 0.05, 0.1, 0.15, 0.2, 0.25, 0.3, 0.35, 0.4, 0.45, and 0.49, including any and all ranges and subranges therein.

As noted above, the determination of Q may be suitably carried out according to the procedures in U.S. Patent Publication 2008/0035292, published Feb. 14, 2008.

In essence, Q is a measurement of the amount of the starch as one progresses from the outside edges towards the middle of the sheet from a cross section view. It is understood herein that the Q may be any Q such that it represents an enhanced capacity to have starch towards the outside surfaces of the cross section of the sheet and Q may be selected (using any test) such that any one or more of the above and below-mentioned characteristics of the paper substrate are provided (e.g. Internal Bond, Hygroexpansivity, IGT Pick, and/or IGT VPP delamination, etc).

Other methods are available for measuring the equivalent of Q. In one embodiment, any Q measurement, or a similar method of measuring the ratio of the amount of sizing agent containing the composition towards the core of the substrate compared to the amount of sizing agent towards the outside surface or surfaces of the substrate is acceptable. In one embodiment, this ratio is such that as much sizing agent as possible is located towards the outside surfaces of the substrate, thereby minimizing the interpenetration zone and/or minimizing the amount of starch located in the interpenetration layer, is achieved. It is also possible that the distribution of sizing agent occurs even at very high level of sizing agent loadings, preferably external sizing agent loadings, within and/or onto the substrate. Thus, in the case that an I-beam structure is formed, it is desirable to control the amount of sizing agent located within the interpenetration layer as more and more external sizing agent is loaded thereon its surface by either minimizing the concentration of the sizing agent in this interpenetration layer or by reducing the thickness of the interpenetration layer itself. In one embodiment, the characteristics of the recording sheet and/or paper substrate are those that can be achieved by such control of the sizing agent. While this controlled loading of the sizing agent can occur in any manner, it is preferable that the sizing agent is loaded or applied via a size press.

The recording sheet may be made by contacting the composition, containing a sizing agent with the cellulose fibers of the paper substrate. The contacting may occur at acceptable concentration levels of the sizing agent and/or other additives.

The recording sheet may be made by contacting the substrate with an internal and/or surface sizing solution or formulation containing the composition according to the present invention and additionally at least one sizing agent. The contacting may occur anytime in the papermaking process including, but not limited to the wet end, head box, size press, water box, and/or coater. Further addition points include machine chest, stuff box, and suction of the fan pump. The cellulose fibers, sizing agent, and/or optional components may be contacted serially, consecutively, and/or simultaneously in any combination with each other. Most preferably, the paper substrate is contacted with the size press formulation at the size press.

The paper substrate may be passed through a size press, where any sizing means commonly known in the art of papermaking is acceptable. The size press, for example, may be a puddle mode size press (e.g. inclined, vertical, horizontal) or metered size press (e.g. blade metered, rod metered). Preferably, the size press is a metered size press.

To prepare the size press formulation, one or more divalent water soluble metal salts may be admixed with one or more sizing agents for example, starches, and one or more optional additives can be dissolved or dispersed in an appropriate liquid medium, preferably water, and can be applied to the substrate.

For example, the size press formulation can be applied with conventional size press equipment having vertical, horizontal or inclined size press configurations conventional used in paper preparation as for example the Symsizer (Valmet) type equipment, a KRK size press (Kumagai Riki Kogyo Co., Ltd., Nerima, Tokyo, Japan) by dip coating. The KRK size press is a lab size press that simulates a commercial size press. This size press is normally sheet fed, whereas a commercial size press typically employs a continuous web.

In one embodiment, the sizing agent is applied in an amount such such that a dry pickup of 30 to 150 lbs of starch/ton of paper at 12-50% solids for the size press formulation. Here, lbs/ton is calculated on a paper having a basis weight equal to 75 gsm.

The aforementioned range of starch includes all values and subranges therebetween, including 30, 35, 40, 45, 50, 55, 60, 65, 70, 75, 80, 85, 90, 95, 100, 105, 110, 115, 120, 125, 130, 135, 140, 145, and 150 lbs/ton. Here, lbs/ton is calculated on a paper having a basis weight equal to 75 gsm.

It should be readily apparent that the amounts in lbs/ton and moles/ton may vary in a known manner according to the basis weight of the paper, and the invention is not limited to only paper having a basis weight of 75 gsm.

In one embodiment, wherein an I-beam structure is formed, in which calcium chloride is used as the water soluble metal salt, and in which a sizing agent is present on both sides of a sheet of paper, the amount ranges from about 2 to about 8 lbs of $CaCl_2$/ton of paper on a paper having a basis weight equal to 75 gsm. This range includes all values and subranges therebetween, including about 2, 3, 4, 5, 6, 7, and 8 lbs of $CaCl_2$/ton of paper. This range is equal to a range from about 0.6 to 8 lbs of $CaCl_2$/ton of paper on a paper having a basis weight equal to 250 gsm. This range includes all values and subranges therebetween, including 0.6, 1, 2, 3, 4, 5, 6, 7, and 8 lbs of $CaCl_2$/ton of paper.

In one embodiment, the % solids in the size press formulation may suitably range from at least 12-50%. This range includes all values and subranges therebetween, including 12, 13, 14, 15, 16, 17, 18, 19, 20, 21, 22, 23, 24, 25, 30, 35, 40, 45, and 50%.

In one embodiment, the dry pickup of the sizing agent may suitably range from 0.25 to 6 gsm, which range includes all values and subranges therebetween, for example, 0.25, 0.3, 0.4, 0.5, 0.6, 0.7, 0.8, 0.9, 1, 2, 3, 4, 5, and 6 gsm, and any combination thereof.

In one embodiment, the wet film thickness is adjusted to give proper pickup. For example, in one embodiment, the wet film thickness may suitably range from greater than zero to 40 mm. This range includes all values and subranges therebetween, including greater than zero, 1, 2, 3, 4, 5, 6, 7, 8, 9, 10, 15, 16, 17, 18, 19, 20, 25, 30, 35, and 40 microns. In one embodiment, the wet film thickness ranges from 10 to 30 microns. In one embodiment, the wet film thickness ranges from 15 to 25 microns.

In one embodiment, the amount of pigment at the size press (in the sizing formulation) may suitably range from 10 to 80 lbs/ton. This range includes all values and subranges therebetween, including 10, 11, 12, 13, 14, 15, 16, 17, 18, 19, 20, 22, 24, 26, 28, 30, 35, 40, 45, 50, 55, 60, 65, 60, 75 and 80 lbs/ton. Here, lbs/ton is calculated using a basis weight of 20# bond paper (75 gsm).

In one embodiment, the temperature at the size press may suitably range from 100-300° F. This range includes all values and subranges therebetween, including 100, 110, 120, 130, 140, 150, 160, 170, 180, 190, 200, 210, 220, 230, 240, 250, 260, 270, 280, 290, and 300° F.

In one embodiment, a rod-metered size press is used. In such an embodiment, a suitable rod volume may range from 0.000864 in$^2$/in to 0.001637 in$^2$/in. This range includes all values and subranges therebetween, including 0.000865, 0.00087, 0.0009, 0.0010, 0.0015, and 0.001637 in$^2$/in.

When the cellulosic fibers are contacted with the size press formulation at the size press, it is preferred that the viscosity of the sizing solution is from 50 to 500 centipoise using a Brookfield Viscometer, number 2 spindle, at 100 rpm and 150° F. These ranges include all values and subranges therebetween, including 50, 55, 60, 65, 70, 75, 80, 85, 90, 95, 100, 125, 150, 160, 170, 180, 190, 200, 210, 220, 230, 240, 250, 260, 270, 280, 290, 300, 325, 350, 375, 400, 425, and 450 centipoise as measured using a Brookfield Viscometer, number 2 spindle, at 100 rpm and 150° F., including any and all ranges and subranges therein. In one embodiment, the viscosity ranges from 50 to 350 centipoise. In another embodiment, the viscosity ranges from 100 to 500 centipoise.

The paper substrate may be pressed in a press section containing one or more nips. Any pressing means commonly known in the art of papermaking may be utilized. The nips may be, but are not limited to, single felted, double felted, roll, and extended nip in the presses. When the sizing solution containing the sizing agent is contacted with the fibers at the size press to make the paper substrate, the effective nip pressure is not particularly limited so long as integrity of the I-beam structure is maintained. For example, the nip pressure may suitably range from greater than zero to 80 kN/m. This range includes all values and subranges therebetween, including greater than zero, 1, 2, 3, 4, 5, 6, 7, 8, 9, 10, 15, 20, 25, 30, 35, 40, 45, 50, 55, 60, 70, and 80 kN/m, including any and all ranges and subranges therein. In one embodiment, the nip pressure ranges from 30 to 80 kN/m.

The nip width is not particularly limited, and may suitably range from greater than zero to 40 mm. This range includes all values and subranges therebetween, including greater than zero, 1, 2, 3, 4, 5, 6, 7, 8, 9, 10, 15, 16, 17, 18, 19, 20, 25, 30, 35, and 40 mm. In one embodiment, the nip width ranges from 15 to 30 mm.

The rolls of the size press may have a P&J hardness, preferably any P&J hardness. Since there are two rolls, a first roll may have a first hardness, while a second roll may have a second hardness. The roll hardness may suitably range from 0 to 30 P&J hardness. This range includes all values and subranges therebetween, including 0, 1, 2, 3, 4, 5, 6, 7, 8, 9, 10, 15, 20, 25, and 30 P&J hardness. If two rolls are used, they may have the same or different hardnesses. The first hardness and the second hardness may be equal and/or different from one another. As an example, the P&J of a first roll at the size press may have a first hardness that independently ranges from 0 to 30 P&J hardness, while the second roll may have a second hardness that independently ranges from 0 to 30 P&J hardness.

The paper substrate may be dried in a drying section. Any drying means commonly known in the art of papermaking may be utilized. The drying section may include and contain a drying can, cylinder drying, Condebelt drying, IR, or other drying means and mechanisms known in the art. The paper substrate may be dried so as to contain any selected amount of water. Preferably, the substrate is dried to contain less than or equal to 10% water.

The paper substrate may be calendered by any commonly known calendaring means in the art of papermaking. More specifically, one could utilize, for example, wet stack calendering, dry stack calendering, steel nip calendaring, hot soft calendaring or extended nip calendering, etc.

The paper substrate may be microfinished according to any process commonly known in the art of papermaking. Microfinishing typically involves frictional processes to finish surfaces of the paper substrate. The paper substrate may be microfinished with or without a calendering applied thereto consecutively and/or simultaneously. Examples of microfinishing processes can be found in U.S. Patent Publication No. 2004/0123966 and references cited therein, as well as U.S. Provisional Patent Application No. 60/810,181 filed Jun. 2, 2006, which are all hereby, in their entirety, herein incorporated by reference.

In one embodiment, the paper substrate comprising the composition and a sizing agent may be further coated by any conventional coating layer application means, including impregnation means. A preferred method of applying the coating layer is with an in-line coating process with one or more stations. The coating stations may be any of known coating means commonly known in the art of papermaking including, for example, brush, rod, air knife, spray, curtain, blade, transfer roll, reverse roll, and/or cast coating means, as well as any combination of the same.

The further coated paper substrate may be dried in a drying section. Any drying means commonly known in the art of papermaking and/or coatings may be utilized. The drying section may include and contain IR, air impingement dryers and/or steam heated drying cans, or other drying means and mechanisms known in the coating art.

The further coated substrate may be finished according to any finishing means commonly known in the art of papermaking. Examples of such finishing means, including one or more finishing stations, include gloss calendar, soft nip calendar, and/or extended nip calendar.

These paper substrate and/or recording sheet may be added to any conventional papermaking processes, as well as converting processes, including abrading, sanding, slitting, scoring, perforating, sparking, calendaring, sheet finishing, converting, coating, laminating, printing, etc. In one embodiment, the conventional processes include those tailored to produce paper substrates capable to be utilized as coated and/or uncoated paper products, board, and/or substrates. These and other suitable processes may be found in textbooks such as the "Handbook for Pulp and Paper Technologists" by G. A. Smook (1992), Angus Wilde Publications, which is hereby incorporated, in its entirety, by reference.

The recording sheet and/or paper substrate may also include one or more optional substances such as retention aids, binders, fillers, thickeners, and preservatives. Examples of fillers include, but are not limited to, clay, calcium carbonate, calcium sulfate hemihydrate, and calcium sulfate dehydrate, chalk, GCC, PCC, and the like. A preferable filler is calcium carbonate with the preferred form being precipitated calcium carbonate. Examples of binders include, but are not limited to, polyvinyl alcohol, Amres (a Kymene type), Bayer Parez, polychloride emulsion, modified starch such as hydroxyethyl starch, starch, polyacrylamide, modified polyacrylamide, polyol, polyol carbonyl adduct, ethanedial/polyol condensate, polyamide, epichlorohydrin, glyoxal, glyoxal urea, ethanedial, aliphatic polyisocyanate, isocyanate, 1,6 hexamethylene diisocyanate, diisocyanate, polyisocyanate, polyester, polyester resin, polyacrylate, polyacrylate resin, acrylate, and methacrylate. Other optional substances include, but are not limited to silicas such as colloids and/or sols. Examples of silicas include, but are not limited to, sodium silicate and/or borosilicates. Another example of optional substances are solvents including but not limited to solvents such as water. Combinations of optional substances are possible.

The recording sheet of the present invention may contain from 0.001 to 20 wt % of the optional substances based on the total weight of the substrate, preferably from 0.01 to 10 wt %, most preferably 0.1 to 5.0 wt %, of each of at least one of the optional substances. This range includes 0.001, 0.002, 0.005, 0.006, 0.008, 0.01, 0.02, 0.03, 0.04, 0.05, 0.1, 0.2, 0.4, 0.5, 0.6, 0.7, 0.8, 0.9, 1, 2, 4, 5, 6, 8, 10, 12, 14, 15, 16, 18, and 20 wt % based on the total weight of the substrate, including any and all ranges and subranges therein.

Other conventional additives that may be present include, but are not limited to, wet strength resins, internal sizes, dry strength resins, alum, fillers, pigments and dyes. The substrate may include bulking agents such as expandable microspheres, pulp fibers, and/or diamide salts.

The paper substrate or sizing agent may optionally contain a bulking agent in any amount, if present, ranging from 0.25 to 50 dry lbs per ton of finished substrate, preferably from 5 to 20, dry lb per ton of finished product when such bulking means is an additive. This range includes 0.25, 0.5, 0.75, 1.0, 2.0, 2.5, 3.0, 3.5, 4, 4.5, 5, 5.5, 6, 6.5, 7, 7.5, 8, 8.5, 9, 9.5, 10, 11, 12, 13, 14, 15, 20, 25, 30, 35, 40, 45, and 50 dry lb per ton of finished product, including any and all ranges and subranges therein.

The bulking agent may be an expandable microsphere, composition, and/or particle for bulking paper articles and substrates. However, any bulking agent can be utilized, while the expandable microsphere, composition, particle and/or paper substrate of that follows is the preferred bulking means. Other alternative bulking agents include, but are not limited to, surfactants, Reactopaque, pre-expanded spheres, BCTMP (bleached chemi-thermomechanical pulp), microfinishing, and multiply construction for creating an I-beam effect in a paper or paper board substrate. Such bulking agents may, when incorporated or applied to a paper substrate, provide adequate print quality, caliper, basis weight, etc in the absence of harsh calendaring conditions (i.e. pressure at a single nip and/or less nips per calendaring means), yet produce a paper substrate having the a single, a portion of, or combination of the physical specifications and performance characteristics mentioned herein.

In one embodiment, the paper substrate may contain from 0.001 to 10 wt %, preferably from 0.02 to 5 wt %, more preferably from 0.025 to 2 wt %, most preferably from 0.125 to 0.5 wt % of expandable microspheres based on the total weight of the substrate.

Examples of expandable microspheres having bulking capacity are those described in U.S. Patent Application No. 60/660,703 filed Mar. 11, 2005, and U.S. patent application Ser. No. 11/374,239 filed Mar. 13, 2006, which are also hereby incorporated, in their entirety, by reference. Further examples include those found in U.S. Pat. No. 6,379,497, filed May 19, 1999, and U.S. Patent Publication No. 2006/0102307, filed Jun. 1, 2004, which are also hereby incorporated, in their entirety, by reference.

Some examples of bulking fibers include, but are not limited to, mechanical fibers such as ground wood pulp, BCTMP, and other mechanical and/or semi-mechanical pulps. When such pulps are added, from 0.25 to 75 wt %, preferably less than 60 wt % of total weight of the fibers used may be from such bulking fibers.

Examples of diamide salts include those described in U.S. Patent Publication No. 2004/0065423, filed Sep. 15, 2003, which is hereby incorporated in its entirety by reference. Non-limiting examples of such salts include mono- and distearamides of animoethylethalonalamine, which may be commercially known as Reactopaque 100, (Omnova Solutions Inc., Performance Chemicals, 1476 J. A. Cochran By-Pass, Chester, S.C. 29706, USA and marketed and sold by Ondeo Nalco Co., with headquarters at Ondeo Nalco Center, Naperville, Ill. 60563, USA) or chemical equivalents thereof. When such salts are used, about 0.025 to about 0.25 wt % by weight dry basis of the diamide salt may be used.

Other optional components include nitrogen containing compounds. Non-limiting examples of these include nitrogen containing organic species, for example oligomers and polymers which contain one or more quaternary ammonium functional groups. Such functional groups may vary widely and include, for example, substituted and unsubstituted amines, imines, amides, urethanes, quaternary ammonium groups, dicyandiamides, guanides, and the like. Illustrative of such materials are polyamines, polyethyleneimines, copolymers of diallyldimethyl ammonium chloride (DADMAC), copolymers of vinyl pyrrolidone (VP) with quaternized diethylaminoethylmethacrylate (DEAMEMA), polyamides, cationic polyurethane latex, cationic polyvinyl alcohol, polyalkylamines dicyandiamid copolymers, amine glycigyl addition polymers, poly[oxyethylene (dimethyliminio) ethylene (dimethyliminio) ethylene] dichlorides, guanidine polymers, and polymeric biguanides. Combinations of these nitrogen containing compounds are possible. Some examples of these compounds are described in, for example, U.S. Pat. Nos. 4,554,181, 6,485,139, 6,686,054, 6,761,977 and 6,764,726, the entireties of each of which being hereby incorporated by reference.

The expandable microspheres may contain an expandable shell forming a void inside thereof. The expandable shell may comprise a carbon and/or heteroatom containing compound. An example of a carbon and/or heteroatom containing compound may be an organic polymer and/or copolymer. The polymer and/or copolymer may be branched and/or crosslinked.

Expandable microspheres preferably are heat expandable thermoplastic polymeric hollow spheres containing a thermally activatable expanding agent. Examples of expandable microsphere compositions, their contents, methods of manufacture, and uses can be found, in U.S. Pat. Nos. 3,615,972; 3,864,181; 4,006,273; 4,044,176; and 6,617,364 which are hereby incorporated, in their entirety, herein by reference. Further reference can be made to U.S. Patent Publication Nos. 2001/0044477; 2003/0008931; 2003/0008932; and 2004/0157057, which are hereby incorporated, in their entirety, by reference. Microspheres may be prepared from polyvinylidene chloride, polyacrylonitrile, poly-alkyl methacrylates, polystyrene or vinyl chloride.

Microspheres may contain a polymer and/or copolymer that has a Tg ranging from −150 to +180° C., preferably from 50 to 150° C., most preferably from 75 to 125° C.

Microspheres may also contain at least one blowing agent which, upon application of an amount of heat energy, functions to provide internal pressure on the inside wall of the microsphere in a manner that such pressure causes the sphere to expand. Blowing agents may be liquids and/or gases. Further, examples of blowing agents may be selected from low boiling point molecules and compositions thereof. Such blowing agents may be selected from the lower alkanes such as neopentane, neohexane, hexane, propane, butane, pentane, and mixtures and isomers thereof. Isobutane is the preferred blowing agent for polyvinylidene chloride microspheres. Examples of coated unexpanded and expanded microspheres are disclosed in U.S. Pat. Nos. 4,722,943 and 4,829,094, which are hereby incorporated, in their entirety, by reference.

The expandable microspheres may have a mean diameter ranging from about 0.5 to 200 microns, preferably from 2 to 100 microns, most preferably from 5 to 40 microns in the unexpanded state and having a maximum expansion of from about 1.5 and 10 times, preferably from 2 to 10 times, most preferably from 2 to 5 times the mean diameters.

In one embodiment, the expandable microspheres may be neutral, negatively or positively charged, preferably negatively charged.

If desired, one or more reducing agents may be optionally added to enhance the effect of the optical brighteners. Some examples of reducing agents are discussed in U.S. Patent Application Publication 2007/0062653, incorporated herein by reference in its entirety. If utilized, one measure of an effective amount of reducing agent added to bleached pulp or paper product is that which enhances the brightness and resistance to thermal yellowing of the pulp or paper compared to pulp or paper which is not treated with the reducing agents. Methods for determining brightness and resistance to thermal yellowing are known.

In one embodiment, a reducing agent is not used.

In one embodiment, a recording sheet prepared with the composition which contains a divalent metal salt, a complexing agent, and an optical brightening agent desirably exhibits an enhanced image dry time as determined by the amount of ink transferred from a printed to an unprinted portion of the recording sheet after rolling with a roller of fixed weight. The "ink transfer", that is defined as the amount of optical density transferred after rolling with a roller; it is expressed as a percentage of the optical density transferred to the unprinted portion of the recording sheet after rolling with a roller. The method involves printing solid colored blocks on paper, waiting for a fixed amount of time, 5 seconds after printing, and then folding in half so that the printed portion contacts an unprinted portion of the recording sheet, and rolling with a 4.5 lb hand roller as for example roller item number HR-100 from Chem Instruments, Inc., Mentor, Ohio, USA. The optical density is read on the transferred ($OD_T$), the non-transferred ($OD_O$) portions of the block, and an un-imaged area ($OD_B$) by a reflectance densitometer (X-Rite, Macbeth. Etc.). The percent transferred ("IT %") is defined as IT % =[($OD_T$−$OD_B$)/($OD_O$−$OD_B$)]×100.

Given the teachings herein, the Hercules Sizing Test Value ("HST") of the substrate prepared with the composition may be suitably selected such that the recording sheet has a percent ink transferred ("IT %") equal to or less than about 60. Preferably, the IT % is from 0% to about 50%. More preferably, the IT % is from 0% to about 40%. Most preferably, the IT % is from 0% to about 30%.

In addition to improved image dry time, the recording sheets exhibit good print quality. As used herein, print quality (PQ) is measured by two important parameters: print density and edge acuity. Print density is measured using a reflectance densitometer (X-Rite, Macbeth. Etc.) in units of optical density ("OD"). The method involves printing a solid block of color on the sheet, and measuring the optical density. There is some variation in OD depending on the particular printer used and the print mode chosen, as well as the densitometer mode and color setting. The printer is not particularly limited and may be, for example, an HP Deskjet 6122, manufactured by Hewlett-Packard, which uses a #45 (HP product number 51645A) black ink jet cartridge. The print mode is determined by the type of paper and the print quality selected. The default setting of Plain Paper type and Fast Normal print quality print mode may be suitably selected. A suitable densitometer may be an X-Rite model 528 spectrodensitometer with a 6 mm aperture. The density measurement settings may suitably be Visual color, status T, and absolute density mode. An increase in print density may typically be seen when sufficient amounts of divalent water soluble metal salts are on the paper surface. In general, the target optical density for pigment black ("$OD_O$") is equal to or greater than 1.30 in the standard (plain paper, normal) print mode for the HP desktop ink jet printers that use the most common black pigment ink (equivalent to the #45 ink jet cartridge). Preferably, the $OD_O$ is equal to or greater than about 1.40. More preferably, the $OD_O$ is equal to or greater than about 1.50. Most preferably, the OD is equal to or greater than about 1.60.

Recording sheets exhibit good edge acuity ("EA"). Edge acuity is measured by an instrument such as the QEA Personal Image Analysis System (Quality Engineering Associates, Burlington, Mass.), the QEA ScannerIAS, or the ImageXpert KDY camera-based system. All of these instruments collect a magnified digital image of the sample and calculate an edge acuity value by image analysis. This value is also called edge raggedness, and is defined in ISO method 13660. The method involves printing a solid line 1.27 millimeters or more in length, sampling at a resolution of at least 600 dpi. The instrument calculates the location of the edge based on the darkness of each pixel near the line edges. The edge threshold is defined as the point of 60% transition from the substrate reflectance factor (light area, $R_{max}$) to the image reflectance factor (dark area, $R_{max}$) using the equation $R_{60}=R_{max}-60\%(R_{max}-R_{min})$. The edge raggedness is then defined as the standard deviation of the residuals from a line fitted to the edge threshold of the line, calculated perpendicular to the fitted line. The value of edge acuity is preferably less than about 15. Preferably, the EA is less than about 12. More preferably, the EA is less than about 10. Most preferably, the EA is less than about 8.

A recording sheet prepared using the composition may have any CIE whiteness, but preferably has a CIE whiteness of greater than 70, more preferably greater than 100, most preferably greater than 125 or even greater than 150. The CIE whiteness may be in the range of from 125 to 200, preferably from 130 to 200, most preferably from 150 to 200. The CIE whiteness range may be greater than or equal to 70, 80, 90, 100, 110, 120, 125, 130, 135, 140, 145, 150, 155, 160, 65, 170, 175, 180, 185, 190, 195, and 200 CIE whiteness points, including any and all ranges and subranges therein. Examples of measuring CIE whiteness and obtaining such whiteness in a papermaking fiber and paper made therefrom can be found, for example, in U.S. Pat. No. 6,893,473, which is hereby incorporated, in its entirety, herein by reference. Further, examples of measuring CIE whiteness and obtaining such whiteness in a papermaking fiber and paper made therefrom can be found, for example, in U.S. Patent Application No. 60/654,712 filed Feb. 19, 2005, and U.S. patent application Ser. No. 11/358,543 filed Feb. 21, 2006; Ser. No. 11/445,809 filed Jun. 2, 2006; and Ser. No. 11/446,421 filed Jun. 2, 2006, which are also hereby incorporated, in their entirety, herein by reference.

The recording sheet of the present invention may have any ISO brightness, but preferably greater than 80, more preferably greater than 90, most preferably greater than 95 ISO brightness points. The ISO brightness may be preferably from 80 to 100, more preferably from 90 to 100, most preferably from 95 to 100 ISO brightness points. This range include greater than or equal to 80, 85, 90, 91, 92, 93, 94, 95, 96, 97, 98, 99, and 100 ISO brightness points, including any and all ranges and subranges therein. Examples of measuring ISO brightness and obtaining such brightness in a papermaking fiber and paper made therefrom can be found, for example, in U.S. Pat. No. 6,893,473, which is hereby incorporated, in its entirety, herein by reference. Further, examples of measuring ISO brightness and obtaining such brightness in a papermaking fiber and paper made therefrom can be found, for example, in U.S. Patent Application Nos. 60/654,712 filed Feb. 19, 2005, and U.S. patent application Ser. Nos. 11/358, 543 filed Feb. 21, 2006, which are also hereby incorporated, in their entirety, herein by reference.

A recording sheet prepared in accordance with the present invention has an improved print performance and improved runnability (e.g. print press performance). Print performance may be measured by determining improved ink density, dot gain, trapping, print contrast, and/or print hue, to name a few. Colors traditionally used in such performance tests include black, cyan, magenta and yellow, but are by no means limited thereto. Press performance may be determined by print contamination determinations through visual inspection of press systems, blankets, plates, ink system, etc. Contamination usually includes fiber contamination, coating or sizing contamination, filler or binder contamination, piling, etc. The recording sheet has an improved print performance and/or runnability as determined by each or any one or combination of the above attributes.

A recording sheet prepared using the composition may have any surface strength. Examples of physical tests of a substrate's surface strength that also seem to correlate well with a substrate's print performance are the IGT pick tests and wax pick tests. Further, both tests are known in the art to correlate well with strong surface strength of recording sheets. While either of these tests may be utilized, IGT pick tests are preferred. IGT pick test is a standard test in which performance is measured by Tappi Test Method 575, which corresponds to the standard test ISO 3873.

Paper substrates suitable for use herein may have any basis weight. It may have either a high or low basis weight, including basis weights of at least 10 lbs/3000 square foot, preferably from at least 20 to 500 lbs/3000 square foot, more preferably from at least 40 to 325 lbs/3000 square foot. The basis weight may be at least 10, 20, 30, 40, 50, 60, 70, 80, 90, 100, 125, 150, 175, 200, 225, 250, 275, 300, 325, 350, 375, 400, 425, 450, 475, and 500 lbs/3000 square feet, including any and all ranges and subranges therein.

The recording sheet may be suitably printed by generating images on a surface of the recording sheet using conventional printing processes and apparatus as for example laser, ink jet, offset and flexo printing processes and apparatus. In this method, the recording sheet is incorporated into a printing apparatus; and an image is formed on a surface of the sheet. The recording sheet may be printed with ink jet printing processes and apparatus such as, for example, desk top ink jet printing and high speed commercial ink jet printing. In one embodiment, an ink jet printing process is contemplated wherein an aqueous recording liquid is applied to the recording sheet in an image wise pattern. In another embodiment, an ink jet printing process is contemplated which includes (1) incorporating into an ink jet printing apparatus containing an aqueous ink the recording sheet, and (2) causing droplets of the ink to be ejected in an image wise pattern onto the recording sheet, thereby generating one or more images on the recording sheet. Ink jet printing processes are well known, and are described in, for example, U.S. Pat. Nos. 4,601,777, 4,251,824, 4,410,899, 4,412,224, and 4,532,530. In one embodiment, the ink jet printing apparatus employs a thermal ink jet process wherein the ink in the nozzles is selectively heated in an imagewise pattern, thereby causing droplets of the ink to be ejected onto the recording sheet in imagewise pattern. The recording sheet can also be used in any other printing or imaging process, such as printing with pen plotters, imaging with color laser printers or copiers, handwriting with ink pens, offset printing processes, or the like, provided that the toner or ink employed to form the image is compatible with the recording sheet. The determination of such compatibility is easily carried out given the teachings herein combined with the ordinary skill of one knowledgeable in the printing art.

The relevant contents of each of U.S. Provisional Patent Application 60/759,629, filed Jan. 17, 2006; U.S. Provisional Patent Application 60/853,882, filed Oct. 24, 2006; U.S. Provisional Patent Application 60/759,630, filed Jan. 17, 2006; U.S. patent application Ser. No. 10/662,699, filed Sep. 15, 2003, and published Apr. 8, 2004, as U.S. Patent Application Publication No. 2004/0065423; U.S. patent application Ser. No. 11/655,004, filed Jan. 17, 2007, and published Feb. 14, 2008, as U.S. Patent Application Publication 2008/0035292 are independently incorporated herein by reference.

The entire contents of "Handbook for Pulp and Paper Technologists" by G. A. Smook (1992) Angus Wilde Publications, is incorporated herein by reference.

All of the references, as well as their cited references, cited herein are hereby incorporated by reference with respect to relative portions related to the subject matter of the present invention and all of its embodiments.

EXAMPLES

The present invention may be described in further detail with reference to the following examples. The examples are intended to be illustrative, but the invention is not considered as being limited to the materials, conditions, or process parameters set forth in the examples. All parts and percentages are by unit weight unless otherwise indicated.

Example 1

Ca(II) Decreases OBA Optical Properties

A lab-scale puddle size press was used for the treatment on a Mill A produced base paper. The size press formulation was conventionally represented on the basis of each 100 lb of starch. In this experiment, 40 Lb of OBA (Clariant Leucophor BCW) was used per 100 Lb of cooked ethylated starch (Penford Gum 280, cooked at 18% solids). In one case, 15 Lb of $CaCl_2$ was added. In another case, no Ca(II) was used.

FIG. 1 and the tables below show the effect of Ca(II) on CIE whiteness. It is quite clear, with these two runs (repeated a few days apart), that the presence of Ca(II) significantly decreased the paper optical properties.

| Bench-top size-press, 40 Lb OBA per 100 Lb of ethylated starch. |||
|---|---|---|
| | brightness | whiteness |
| No Ca(II) | 94.2 | 152.1 |
| With Ca(II) | 93.9 | 147.8 |

| Another run, at 40 # of OBA per 100 lb of ethylated starch. ||
|---|---|
| | whiteness |
| No Ca(II) | 152.4 |
| With Ca(II) | 148.3 |

Example 2

Impact of Complexing Agents on CIE Whiteness

A lab-scale size press treatment was conducted, similar to Example 1. In the formulation, 40 Lb of OBA (Leucophore BCW) and 5 Lb of complexing agents were used per 100 Lb of ethylated starch. In one case, 15 Lb of CaCl2 was added in the formulation. In another case, no $CaCl_2$ was added.

Figure 2:
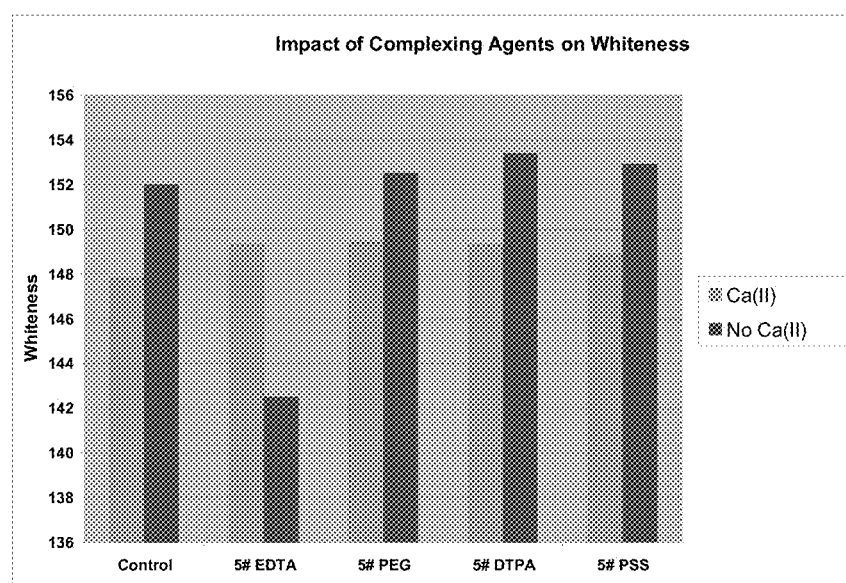
FIG. 2 shows graphical data of several inventive and comparative embodiments and their effects on whiteness.

The results (as shown in the following tables and graphically in FIG. 2) indicate that complexing agents may improve whiteness of paper. Especially in the presence of Ca(II), EDTA complexes with Ca(II) improves whiteness, while EDTA with no Ca(II) does not show a beneficial effect.

| With Ca(II) |||
|---|---|---|
| | Brightness | Whiteness |
| Ca(II) Control | 93.9 | 147.8 |
| 5# EDTA in Ca(II) | 93.8 | 149.3 |
| 5# PEG in Ca(II) | 93.9 | 149.4 |
| 5# DTPA in Ca(II) | 93.8 | 149.3 |
| 5# PSS in Ca(II) | 93.7 | 148.9 |

| Without Ca(II) |||
|---|---|---|
| | Brightness | Whiteness |
| Control-without Ca(II) | 94.5 | 152.0 |
| 5# EDTA without Ca(II) | 93.0 | 142.5 |
| 5# PEG without Ca(II) | 94.2 | 152.5 |
| 5# DTPA without Ca(II) | 94.5 | 153.4 |
| 5# PSS without Ca(II) | 94.5 | 152.9 |

Example 3

Complexing Agents with Ca(II) on Ink-Jet Printing Properties

Figure 3:
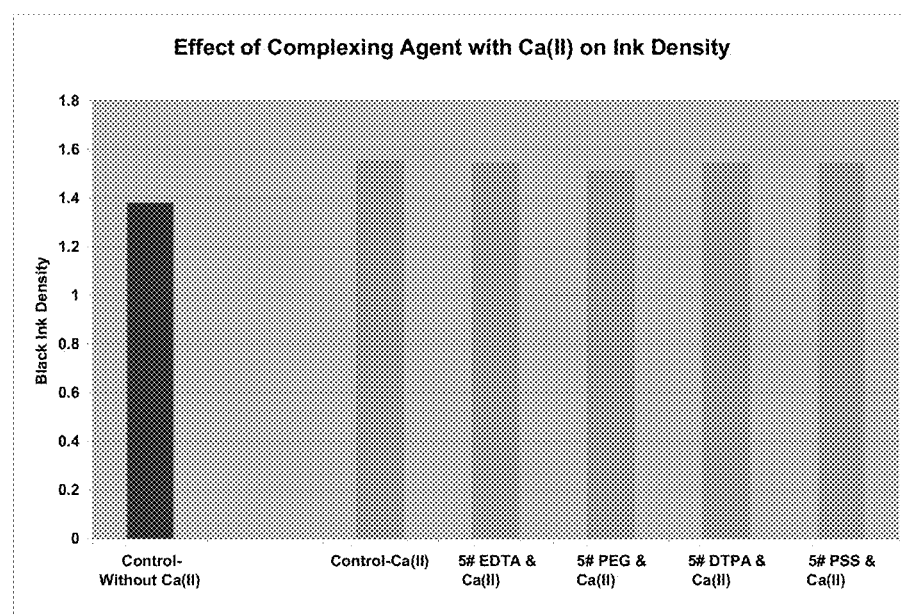
FIG. 3 shows graphical data of several inventive and comparative embodiments and their effects on ink density.
Figure 4:
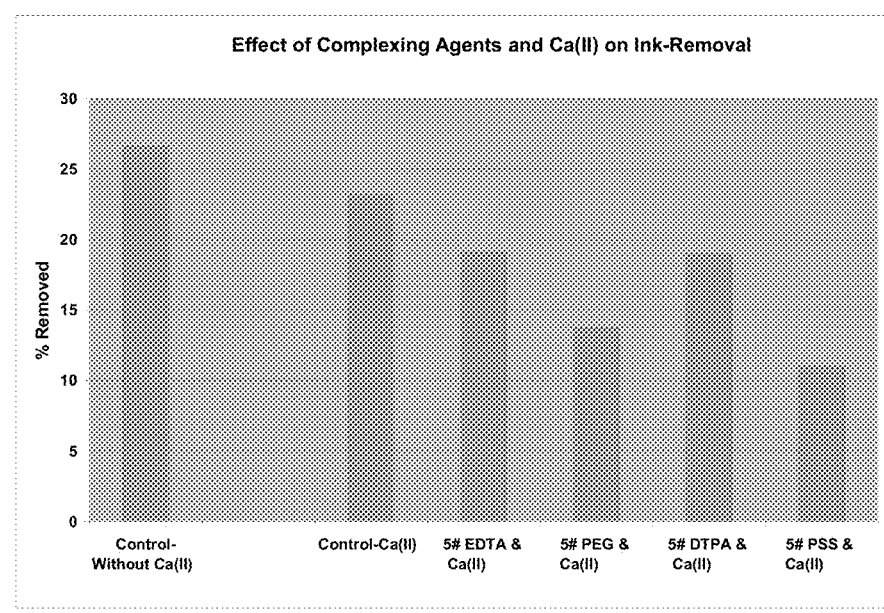
FIG. 4 shows graphical data of several inventive and comparative embodiments and their effects on ink removal.

Soluble Ca(II) is known to improve ink jet printing properties, such as ink density. In this experiment, treated paper samples as in Example 2 were tested for printing properties. It is shown clearly that adding complex agents with Ca(II) did not negatively impact the printing properties. The results are illustrated in the following table and graphically in FIG. 3 and FIG. 4.

| | Ink Density | % Ink-transfer/removal |
|---|---|---|
| Control-without Ca(II) | 1.38 | 26.6% |
| Ca(II) Control | 1.55 | 23.2% |
| 5# EDTA in Ca(II) | 1.54 | 19.1% |
| 5# PEG in Ca(II) | 1.51 | 13.7% |
| 5# DTPA in Ca(II) | 1.54 | 19% |
| 5# PSS in Ca(II) | 1.54 | 11% |

Example 4

Dose-Response of EDTA in Ca(II)

Figure 5:
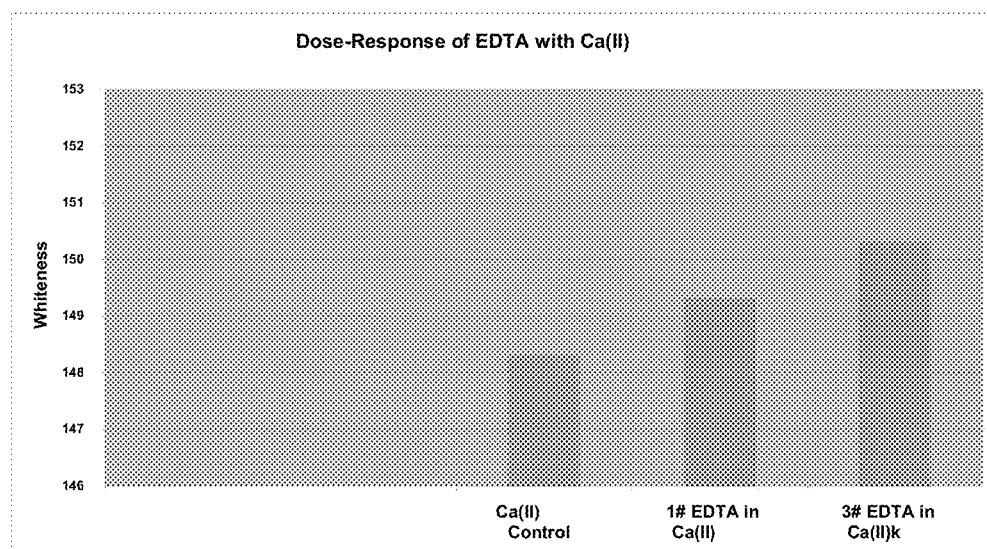
FIG. 5 shows graphical data of several inventive and comparative embodiments and their effects on whiteness.

In a size-press experiment as by Example 1 with 40 Lb of OBA (Leucophore BCW), two doses of EDTA were added for comparison. The dose response of EDTA is illustrated in the following table and graphically in FIG. 5.

| | whiteness |
|---|---|
| Ca(II) Control | 148.3 |
| 1# EDTA in Ca(II) | 149.3 |
| 3# EDTA in Ca(II) | 150.3 |

Example 5

Pilot Scale Size Press Experiment, EDTA (Versene-100) Vs. Nalco's Extra White

A pilot scale size press experiment was conducted to evaluate the effectiveness of EDTA (Dow's Versene-100). Another objective was to obtain a side-by-side comparison with a commercial additive (Nalco's Extra White™ NW-3).

Mill B base paper was used, with size-press running at ~100 ft/min, 150° F., pH~7, pick-up of about 100 Lb starch/ton of paper:
(1) In the control run, 15 Lb of $CaCl_2$ per 100 Lb of starch was used. The OBA (Leucophor BCW) loadings were respectively 0, 15, 30, 45, 60 Lb OBA per 100 Lb ethylated starch.
(2) In the Versene (EDTA) run, 4 Lb of Versene-100 (per 100 Lb starch) were added to the control run case, at various OBA loadings.
(3) In the EW run, 5 Lb of Extra White (per 100 Lb starch) were added to the control run, at various OBA loadings.
(4) All the treated sheets were then heated by running through sheet dryer at 235 F.

Figure 6:
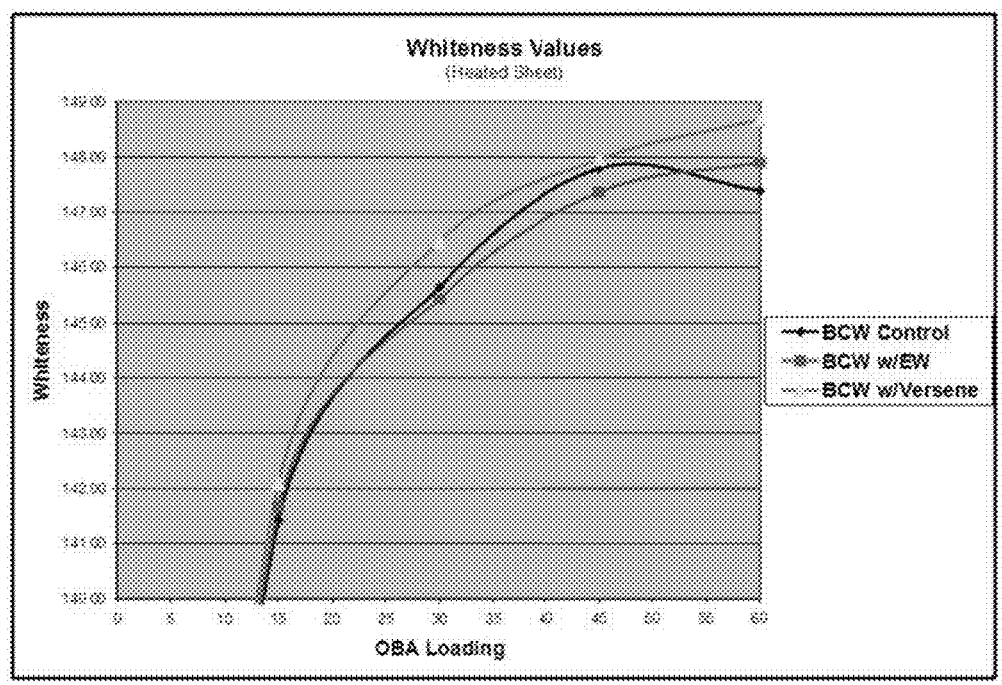
FIG. 6 shows graphical data of several inventive and comparative embodiments and their effects on whiteness.
Figure 7:
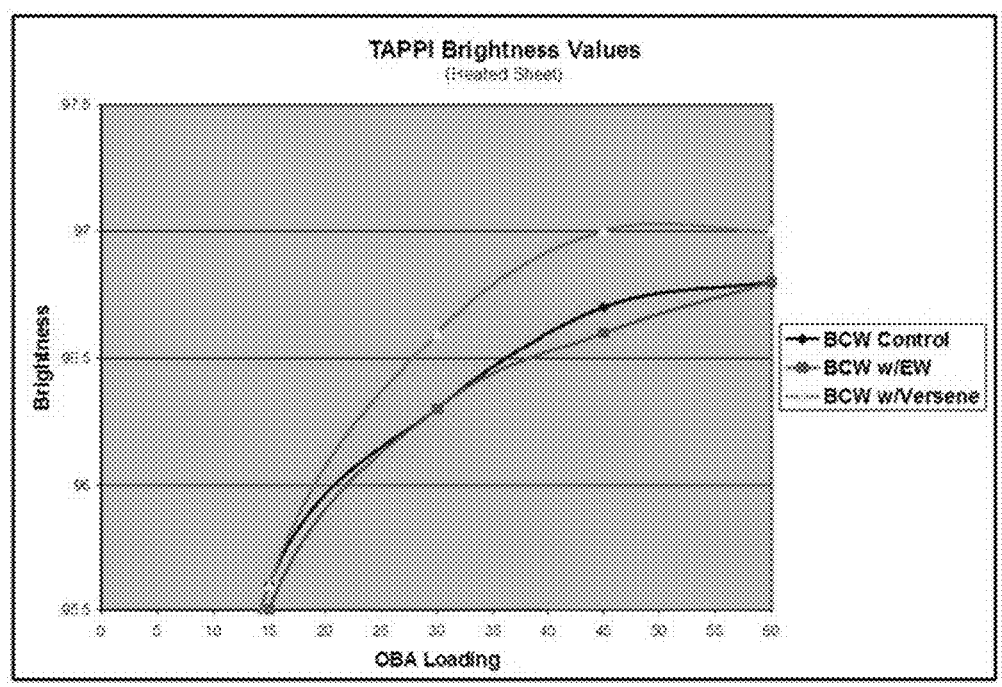
FIG. 7 shows graphical data of several inventive and comparative embodiments and their effects on TAPPI brightness.

The results are shown in FIG. 6 and FIG. 7. It is shown that EDTA (Versene) may improve optical properties—or it may significantly lower the amounts of OBA necessary to achieve the same target whiteness or brightness. It was found that Nalco's Extra White encountered incompatibility and size press runnability issues with the Ca(II) chemistry, and no benefit in optical properties were observed.

Example 6

Pure Solution Soaking Experiment

Base paper sheets were dipped into the aqueous solution containing OBA, $CaCl_2$ and complexing agents. The concentration was adjusted so that the pick-up will correspond to similar size press formulation ratios (but without starch).

The tables below show the results from:
4 Lb/ton paper complexing agent pick-up
15 Lb/ton paper CaCl2 pick-up
OBA pick-up of 0, 10, 20, 40, 60, and 80 Lb/ton paper
Leucophor SUS and Leucophor BCW were used as OBA.

Figure 8:
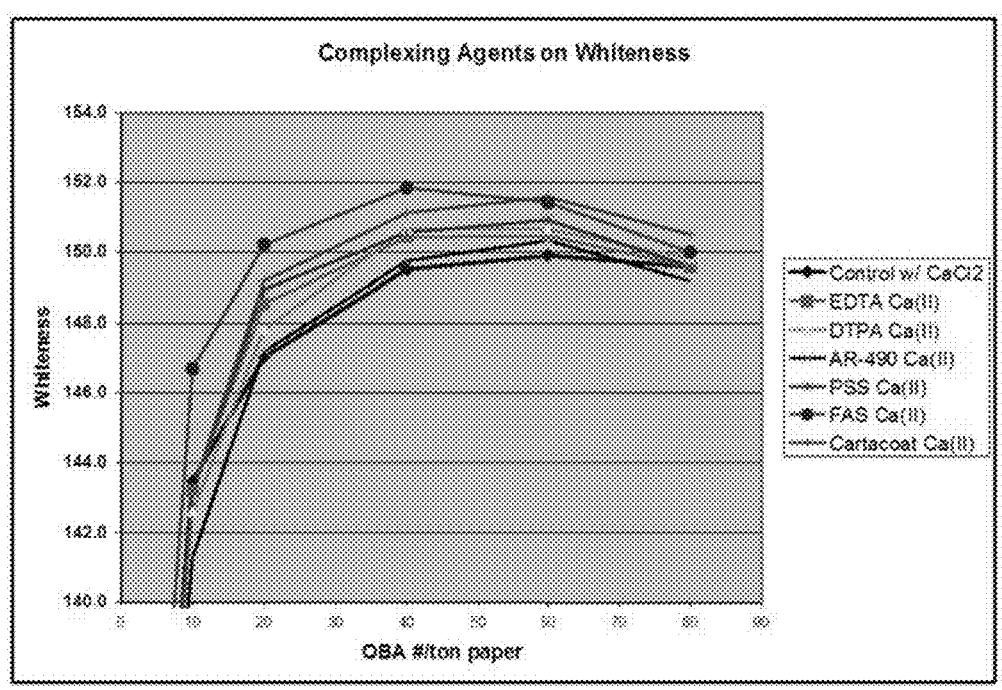
FIG. 8 shows graphical data of several inventive and comparative embodiments and their effects on whitness.
Figure 9:
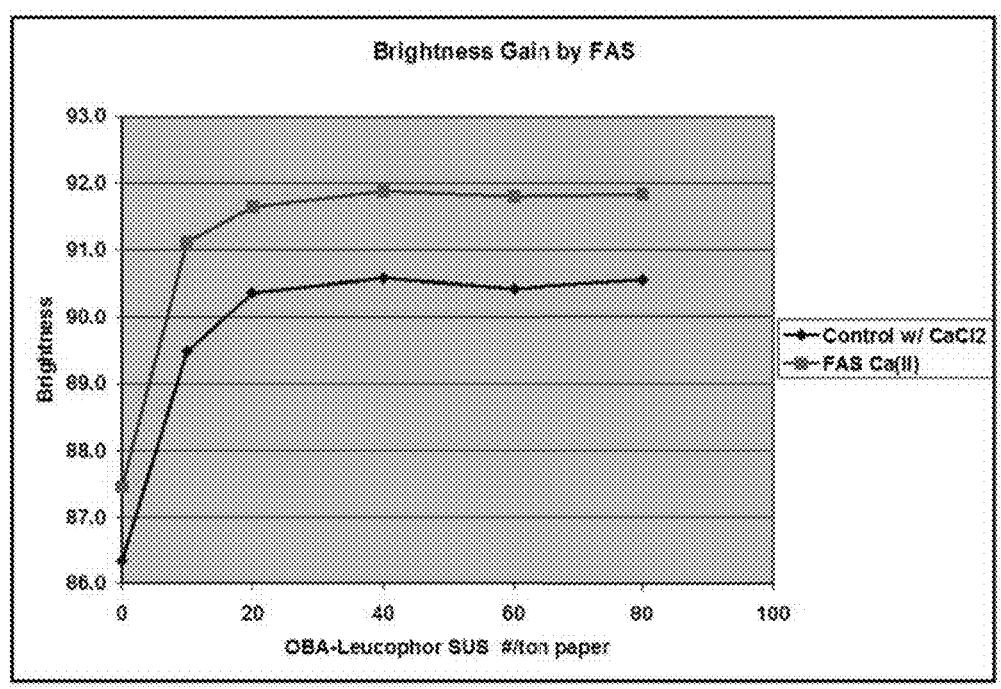
FIG. 9 shows graphical data of several inventive and comparative embodiments and their effects on brightness.
Figure 10:
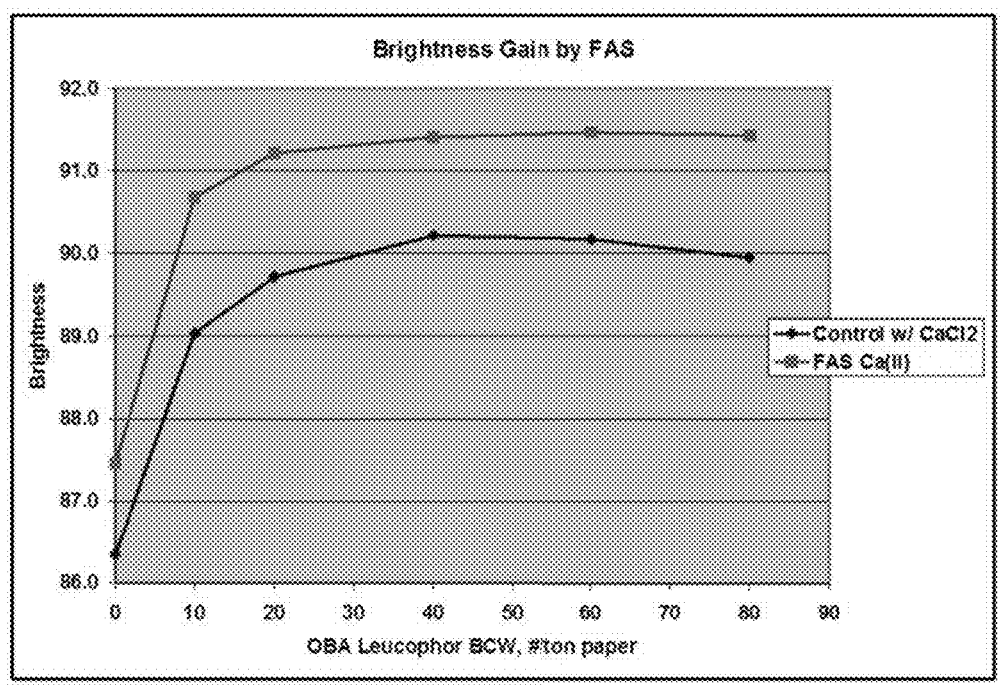
FIG. 10 shows graphical data of several inventive and comparative embodiments and their effects on brightness.

From the results, which are shown in the following tables and graphically in FIGS. 8, 9, and 10, it is obvious that the whiteness gain can be confirmed for the complexing agents. It was also observed that FAS resulted in substantial brightness gain.

Leucophor SUS-Whiteness Gain by Complexing Agents

| OBA #/Ton | Control w/ CaCl2 | EDTA | DTPA | AR-490 | PSS | FAS | Cartacoat |
|---|---|---|---|---|---|---|---|
| 0 | 118.4 | 117.5 | 118.1 | 117.9 | 118.0 | 120.1 | 117.6 |
| 10 | 143.5 | 143.2 | 142.6 | 141.3 | 143.2 | 146.7 | 143.3 |
| 20 | 147.0 | 148.6 | 147.8 | 147.2 | 149.0 | 150.2 | 149.2 |
| 40 | 149.5 | 150.4 | 150.7 | 149.8 | 150.6 | 151.8 | 151.1 |
| 60 | 149.9 | 150.5 | 150.7 | 150.3 | 150.9 | 151.4 | 151.6 |
| 80 | 149.6 | 149.6 | 149.8 | 149.2 | 149.6 | 150.0 | 150.5 |

Leucophor SUS-Brightness Gain by FAS

| OBA #/Ton | Control w/CaCl2 | FAS |
|---|---|---|
| 0 | 86.3 | 87.5 |
| 10 | 89.5 | 91.1 |
| 20 | 90.4 | 91.6 |
| 40 | 90.6 | 91.9 |
| 60 | 90.4 | 91.8 |
| 80 | 90.6 | 91.8 |

Leucophor BCW-Brightness Gain by FAS

| OBA #/ton | Control w/CaCl2 | FAS |
|---|---|---|
| 0 | 86.3 | 87.5 |
| 10 | 89.0 | 90.7 |
| 20 | 89.7 | 91.2 |
| 40 | 90.2 | 91.4 |
| 60 | 90.2 | 91.5 |
| 80 | 89.9 | 91.4 |

Example 7

UV and Photo Stability Due to Complexing Agents in Ca (II)

Figure 12:
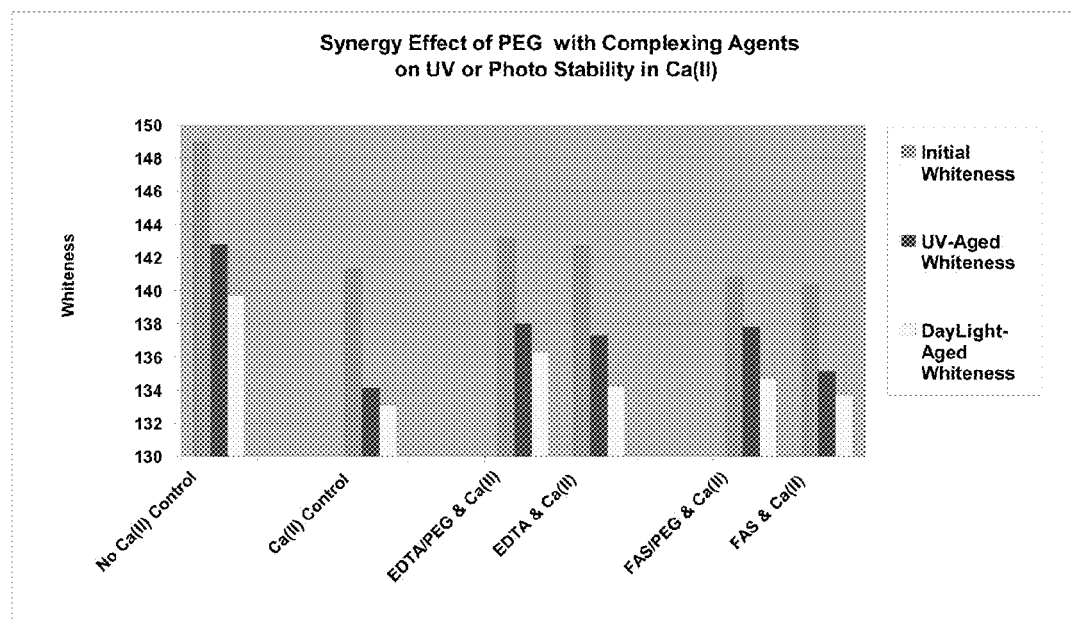
FIG. 12 shows graphical data of several inventive and comparative embodiments and their effect upon UV and daylight aging.

Lab scale size press treatments were carried out as in Example 1. The treated paper sheets were then subjected to aging conditions:
(1) UV aging was conducted inside an enclosed lightbox with UV (dark light) onto the felt side for 24 hours.
(2) Photo aging was conducted inside an enclosed lightbox with Daylight (fluorescent bulb) onto the felt side for 24 hours.
(3) The paper optical properties before and after exposure were tested.
EDTA-Ca(II), DTPA-Ca(II), FAS-Ca(II), (But no by PEG-Ca(II) itself); PEG synergy: PEG/FAS-Ca(II), PEG/EDTA-Ca(II), PEG/DTPA-Ca(II). FIG. 11 shows felt side sheet brightness and whiteness data before and after UV and daylight exposure. FIG. 12 shows a synergy effect of addition of PEG to Ca(II) on UV and photo stability before and after 24 hour exposure to UV and daylight.

Example 8

Ionic Liquid is Effective as Complexing Agent

Lab scale size press treatment was carried out as by Example 1. In the size press formulation, 15 Lb of $CaCl_2$ and 40 Lb of OBA (Leucophor BCW) were used on the basis of 100 Lb of starch per ton of paper.

An Ionic Liquid, BMIM (1-butyl-3-methyl-imidazolium-thiocyanate), was used as an additive of interest and was compared with sodium EDTA (Versene-100) and tetramethyl ammonium EDTA. All these chemicals were applied at 5 Lb per 100 Lb starch.

It was surprisingly found that an ionic liquid may act as a complexing agent and improve the paper optical properties. The results are shown in the table below.

|  | Treated Sheet CIE Whiteness |
|---|---|
| Control Ca(II) | 145.4 |
| EDTA Ca(II) | 146.9 |
| Tetramethyl ammonium EDTA Ca(II) | 146.3 |
| BMIM Ca(II), 1-butyl-3-methyl-imidazolium-thiocyanate | 147.1 |

Ink-Jet printing properties were also tested in some of the paper samples, and were compared with the $CaCl_2$ control as well as a commercial HP Ca(II) paper control. The results are shown in the table below. All the printing properties are within the specification targets.

|  | HP DJ6122 Black Density | HP DJ6122 Dry time % transfer | HP B9180 Color Gammut |
|---|---|---|---|
| Control Ca(II) | 1.49 | 2% | 214162 |
|  | 1.51 | 1% | 215187 |
| EDTA Ca(II) | 1.50 | 2% | 213771 |
|  | 1.50 | 2% | 212630 |
| BMIM Ca(II), 1-butyl-3-methyl-imidazolium-thiocyanat | 1.51 | 7% | 212667 |
|  | 1.50 | 10% | 212183 |
| A Commercial HP Paper | 1.48 | 13% | 206344 |
|  | 1.51 | 13% | 210351 |

As used throughout, ranges are used as a short hand for describing each and every value that is within the range, including all subranges therein.

Numerous modifications and variations on the present invention are possible in light of the above teachings. It is, therefore, to be understood that within the scope of the accompanying claims, the invention may be practiced otherwise than as specifically described herein.

What is claimed is:

1. A recording sheet, comprising:
 a paper substrate comprising a plurality of cellulosic fibers; and
 a composition, comprising:
  a water-soluble salt of Ca(II);
  a complexing agent having an affinity for Ca(II);
  an optical brightening agent; and
  a sizing agent;
 wherein the optical brightening agent is present in an amount ranging from about 10 to 100 pounds per 100 pounds of sizing agent.

2. The recording sheet of claim 1, which further comprises starch, and wherein the complexing agent is present in an amount ranging from about 0.01 Lb/100 Lb starch to about 100 Lb/100 Lb starch.

3. The recording sheet of claim 1, wherein the complexing agent is selected from the group consisting of organic phosphonate, phosphate, carboxylic acid, dithiocarbamate, ethylenediaminetetraacetic acid salt, ethyleneglycoltetraacetic acid salt, diethylenetriaminepentaacetic acid salt, crown ether, ethylenediaminetetraacetic acid, ethylenediaminetetraacetic acid disodium salt, ethylenediaminetetraacetic acid tetrasodium salt, ethylenediaminetetraacetic acid trisodium salt, ethylenediaminetetraacetic acid disodium magnesium salt, ethylenediaminetetraacetic acid disodium calcium salt, ethylenediaminetetraacetic acid diammonium salt, ethylenediaminetetraacetic acid dipotassium salt, ethylenediaminetetraacetic acid tripotassium salt, ethylenediaminetetraacetic acid dilithium salt, ethylenediaminetetraacetic acid tetramethylammonium salt, ethylenediaminetetraacetic acid calcium salt, ethylenediaminetetraacetic acid magnesium salt, ethylenediaminetetraacetic acid aluminum salt, polyacrylic acid, polyacrylic acid salt, polysorbate, poly-4-styrene sulfonic acid salt, glycerol formal, formamidinesulinic acid, sodium hypophosphite, potassium hypophosphite, calcium hypophosphite, organic phosphonate, organic phosphate, dithiocarbamate, sorbitol, sorbic acid, cellulose ether, carboxymethyl cellulose, hydroxyethyl cellulose, polyethylene glycol polypropylene glycol ionic liquids, 1-butyl-3-methylimidazolium-thiocyanate, alkyl imidazolium, 1-ethyl-3-methylimidazolium thiocyanate, 1-ethyl-3-methylimidazolium acetate, 1-ethyl-3-methylimidazolium methyl sulfate, methyl imidazolium, salts thereof, or a combination thereof.

4. The recording sheet of claim 1, wherein the salt is present in an amount of about 0.02 g/m$^2$ to about 4 g/m$^2$ of the recording sheet.

5. The recording sheet of claim 1, wherein the complexing agent is present in an amount ranging from about 0.01 Lb/ton of recording sheet to about 100 Lb/ton of recording sheet.

6. The recording sheet of claim 1, wherein the optical brightening agent is present in an amount ranging from about 0.005 to about 4 weight percent based on the weight of the recording sheet.

7. The recording sheet of claim 1, wherein the complexing agent is selected from the group consisting of ethylenediaminetetraacetic acid salt, ethyleneglycoltetraacetic acid salt, diethylenetriaminepentaacetic acid salt, crown ether, ethylenediaminetetraacetic acid, ethylenediaminetetraacetic acid disodium salt, ethylenediaminetetraacetic acid tetrasodium salt, ethylenediaminetetraacetic acid trisodium salt, ethylenediaminetetraacetic acid disodium magnesium salt, ethylenediaminetetraacetic acid disodium calcium salt, ethylenediaminetetraacetic acid diammonium salt, ethylenediaminetetraacetic acid dipotassium salt, ethylenediaminetetraacetic acid tripotassium salt, ethylenediaminetetraacetic acid dilithium salt, ethylenediaminetetraacetic acid tetramethylammonium salt, ethylenediaminetetraacetic acid calcium salt, ethylenediaminetetraacetic acid magnesium salt, ethylenediaminetetraacetic acid aluminum salt, poly-4-styrene sulfonic acid salt, glycerol formal, formamidinesulinic acid, carboxylic acid, polyethylene glycol, polypropylene glycol, ionic liquid, 1-butyl-3-methylimidazolium-thiocyanate, alkyl imidazolium, 1-ethyl-3-methylimidazolium thiocyanate, 1-ethyl-3-methylimidazolium acetate, 1-ethyl-3-methylimidazolium methyl sulfate, methyl imidazolium, salts thereof, or a combination thereof.

8. The recording sheet of claim 1, wherein the complexing agent comprises polyethylene glycol.

9. The recording sheet of claim 1, wherein the complexing agent comprises an ionic liquid and another complexing agent.

10. The recording sheet of claim 1, wherein the sizing agent comprises starch.

11. The recording sheet of claim 1, wherein the sizing agent is an external sizing agent or a combination of external and internal sizing agents.

12. The recording sheet of claim 1, wherein the salt is calcium halide, calcium nitrate, calcium chlorate, calcium perchlorate, calcium sulfate, calcium acetate, calcium carboxylate, calcium hydroxide, calcium nitrite, or a combination thereof.

13. A method for making a recording sheet, comprising:
contacting a paper substrate comprising a plurality of cellulosic fibers; and
a composition, comprising:
a water-soluble salt of Ca(II);
a complexing agent having an affinity for Ca(II);
an optical brightening agent; and
a sizing agent;
wherein the optical brightening agent is present in an amount ranging from about 10 to 100 pounds per 100 pounds of sizing agent;
to produce a recording sheet.

14. The method of claim 13, wherein the contacting is carried out at a size press.

15. The method of claim 13, wherein the contacting is carried out at a size press; and a dry pickup of the sizing agent is 0.25-6 gsm.

16. The method of claim 13, wherein the complexing agent comprises polyethylene glycol.

17. The method of claim 13, wherein the complexing agent comprises an ionic liquid and another complexing agent.

18. The method of claim 13, wherein the composition is contacted with one side or both sides of the paper substrate.

19. A method, comprising:
forming an image with a printing apparatus on a surface of a recording sheet, said recording sheet comprising:
a paper substrate comprising a plurality of cellulosic fibers; and
a composition, comprising:
a water-soluble salt of Ca(II);
a complexing agent having an affinity for Ca(II);
an optical brightening agent; and
a sizing agent;
wherein the optical brightening agent is present in an amount ranging from about 10 to 100 pounds per 100 pounds of sizing agent.

20. The method of claim 19, wherein the printing apparatus is an ink jet printer.

* * * * *